(12) United States Patent
Thoppil

(10) Patent No.: US 11,171,879 B2
(45) Date of Patent: Nov. 9, 2021

(54) SYSTEM AND METHOD OF SHARING EDGE COMPUTING RESOURCES

(71) Applicant: Wipro Limited, Bangalore (IN)

(72) Inventor: Saji Thoppil, Bangalore (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 16/798,472

(22) Filed: Feb. 24, 2020

(65) Prior Publication Data

US 2021/0211392 A1 Jul. 8, 2021

(30) Foreign Application Priority Data

Jan. 2, 2020 (IN) .............................. 202041000179

(51) Int. Cl.
| | |
|---|---|
| *H04L 12/911* | (2013.01) |
| *G06Q 20/10* | (2012.01) |
| *H04L 12/14* | (2006.01) |
| *H04L 12/24* | (2006.01) |
| *H04L 9/32* | (2006.01) |
| *H04L 12/46* | (2006.01) |

(52) U.S. Cl.
CPC ......... *H04L 47/788* (2013.01); *G06Q 20/102* (2013.01); *H04L 9/3242* (2013.01); *H04L 12/1403* (2013.01); *H04L 12/4633* (2013.01); *H04L 41/5029* (2013.01); *H04L 47/781* (2013.01); *H04L 47/828* (2013.01)

(58) Field of Classification Search
CPC ............. H04L 12/1403; H04L 12/4633; H04L 41/5029; H04L 47/781; H04L 47/788; H04L 47/828; H04L 9/3242; G06Q 20/102
See application file for complete search history.

(56) References Cited

U.S. PATENT DOCUMENTS

| | | | | |
|---|---|---|---|---|
| 6,728,267 B1* | 4/2004 | Giese | .................... | H04L 29/06 370/469 |
| 6,957,199 B1* | 10/2005 | Fisher | .................... | G06Q 20/02 705/50 |
| 7,739,159 B1* | 6/2010 | Chandrupatla | ........ | G06Q 40/12 705/30 |
| 8,856,957 B1* | 10/2014 | Roth | ....................... | G06F 21/33 726/28 |
| 10,057,186 B2* | 8/2018 | Jia | ....................... | H04L 67/2861 |

(Continued)

*Primary Examiner* — Jerry B Dennison

(74) *Attorney, Agent, or Firm* — Finnegan, Henderson, Farabow, Garrett & Dunner, LLP

(57) ABSTRACT

A method and a system of sharing an edge computing resource is disclosed. In an embodiment, the method may include receiving from one or more lessor edge computing resources, one or more first requests for presenting an availability of the one or more lessor edge computing resources, and receiving from a lessee edge computing resource, a second request for availing at least one lessor edge computing resource. The method may further include, upon receiving the second request, presenting the one or more first requests corresponding to the one or more lessor edge computing resources, to the lessee edge computing resource. The method may further include receiving from the lessee edge computing resource, a selection of a first request from the one or more first requests, and creating a connection between the lessee edge computing resource and the lessor edge computing resource corresponding to the received selection.

17 Claims, 14 Drawing Sheets

(56) References Cited

U.S. PATENT DOCUMENTS

| | | | |
|---|---|---|---|
| 10,423,459 B1* | 9/2019 | Jacques de Kadt | G06F 9/50 |
| 10,652,282 B2* | 5/2020 | Sim | H04L 9/3213 |
| 10,742,659 B1* | 8/2020 | Roka | H04L 63/102 |
| 10,785,210 B2* | 9/2020 | Lin | H04W 4/14 |
| 2004/0010592 A1* | 1/2004 | Carver | H04L 47/70 |
| | | | 709/226 |
| 2004/0073661 A1* | 4/2004 | Eibach | G06Q 30/04 |
| | | | 709/224 |
| 2005/0044197 A1* | 2/2005 | Lai | H04L 67/16 |
| | | | 709/223 |
| 2007/0250904 A1* | 10/2007 | Waller | G06F 21/6245 |
| | | | 726/1 |
| 2008/0052718 A1* | 2/2008 | Hundscheidt | H04L 65/80 |
| | | | 718/104 |
| 2011/0314533 A1* | 12/2011 | Austin | H04L 63/08 |
| | | | 726/9 |
| 2012/0110576 A1* | 5/2012 | Lin | G06F 9/50 |
| | | | 718/1 |
| 2013/0151705 A1* | 6/2013 | Menon | G06Q 10/1053 |
| | | | 709/226 |
| 2014/0207946 A1* | 7/2014 | Bakthavathsalu | H04L 63/0272 |
| | | | 709/224 |
| 2014/0278591 A1 | 9/2014 | Blecharczyk et al. | |
| 2014/0278786 A1 | 9/2014 | Liu-Qiu-Yan | |
| 2014/0280940 A1* | 9/2014 | Chapman | H04L 63/02 |
| | | | 709/225 |
| 2015/0082418 A1* | 3/2015 | Gu | H04L 12/4633 |
| | | | 726/15 |
| 2015/0193862 A1* | 7/2015 | Luft | G06Q 30/0639 |
| | | | 705/27.1 |
| 2016/0203422 A1 | 7/2016 | Demarchi et al. | |
| 2017/0046346 A1 | 2/2017 | Zhou et al. | |
| 2017/0237735 A1* | 8/2017 | Johnson | H04L 63/083 |
| | | | 726/5 |
| 2017/0272554 A1* | 9/2017 | Kwan | H04L 43/18 |
| 2017/0339280 A1* | 11/2017 | Lu | H04M 15/8038 |
| 2018/0095997 A1* | 4/2018 | Beveridge | H04L 67/10 |
| 2018/0234464 A1* | 8/2018 | Sim | H04L 9/3213 |
| 2018/0343587 A1* | 11/2018 | Condeixa | H04W 4/027 |
| 2019/0190812 A1* | 6/2019 | Verma | H04L 12/4641 |
| 2019/0261203 A1* | 8/2019 | Raleigh | H04W 12/08 |
| 2019/0311033 A1* | 10/2019 | Evans | H04L 51/02 |
| 2020/0004946 A1* | 1/2020 | Gilpin | H04L 63/10 |
| 2020/0099742 A1* | 3/2020 | Puente Pestana | H04L 67/1021 |
| 2020/0186531 A1* | 6/2020 | Bugenhagen | H04L 67/12 |
| 2020/0220931 A1* | 7/2020 | Dinh | H04L 41/5019 |
| 2020/0304858 A1* | 9/2020 | Smith | H04N 21/4341 |

\* cited by examiner

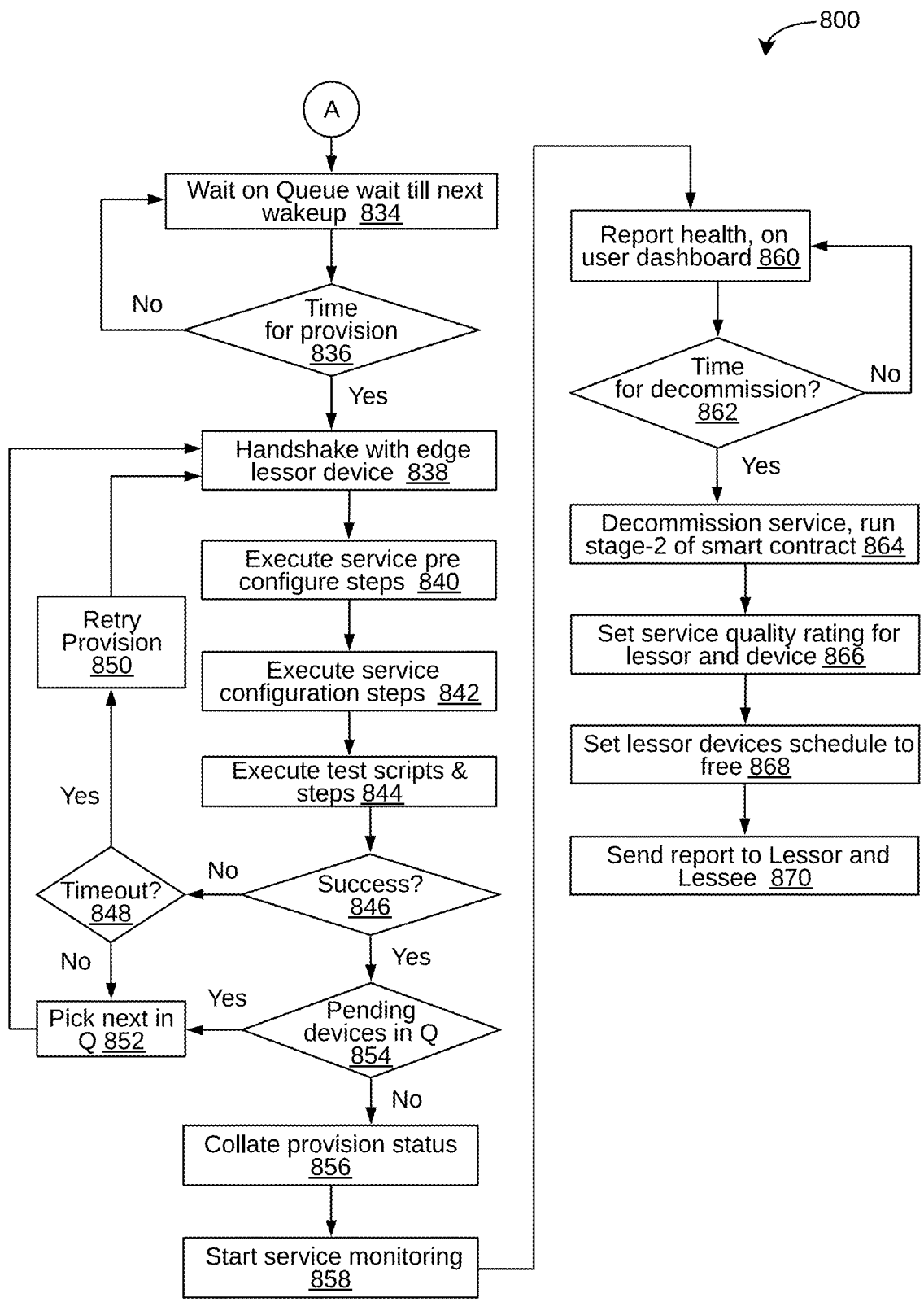
FIG. 8 contd.

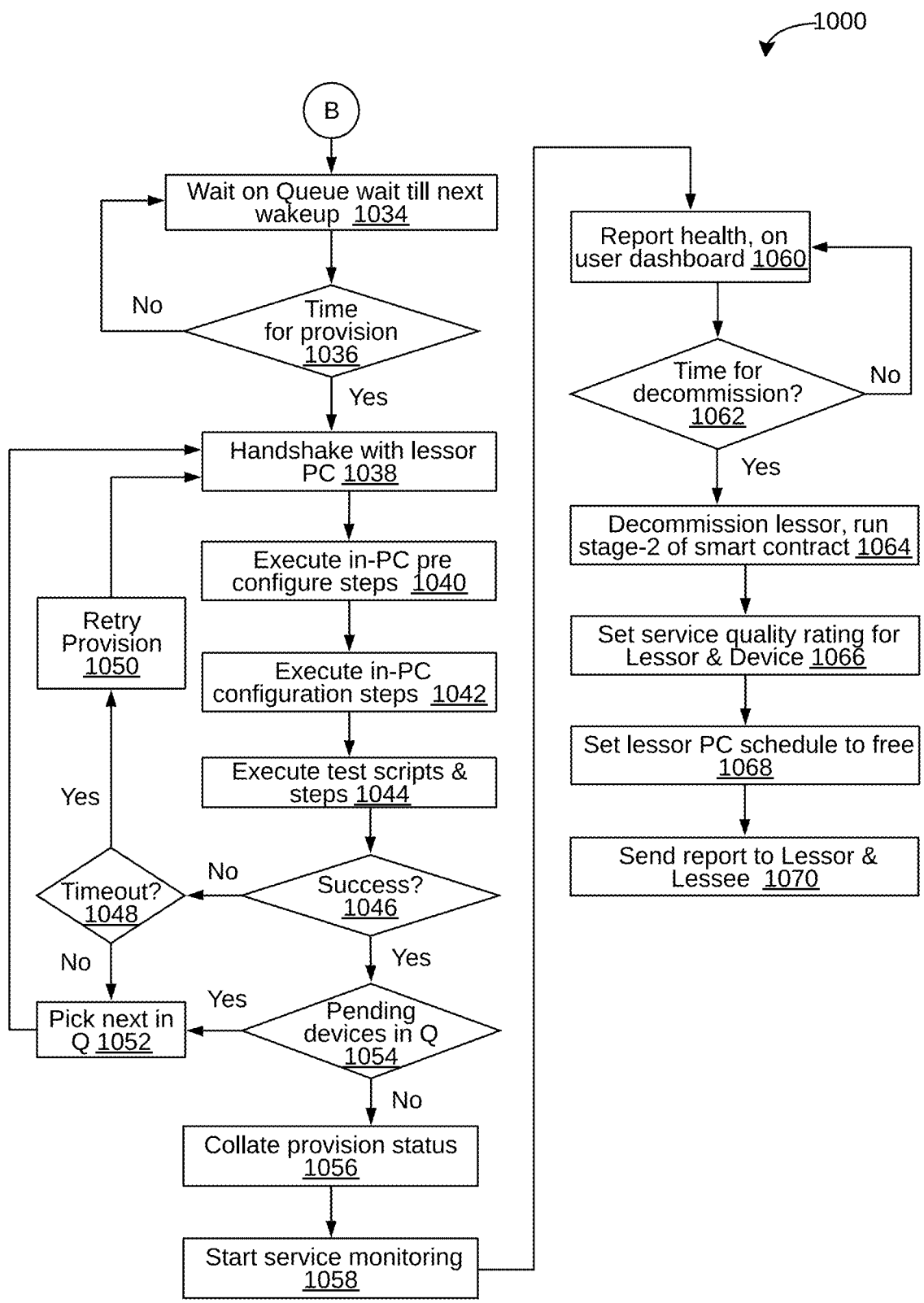
FIG. 10 contd.

SYSTEM AND METHOD OF SHARING EDGE COMPUTING RESOURCES

TECHNICAL FIELD

This disclosure relates generally to sharing computing resources, and more particularly to a method and system of sharing edge computing resources over a sharing platform.

BACKGROUND

With the rising popularity of fifth generation wireless technology, or simply 5G, various new services are expected to emerge that may leverage edge computing paradigm. It may be understood that edge computing resources (ED) may be delivered by computing systems known as edge nodes, and these edge nodes may be dispersed across surroundings, and placed closer to devices that communicate upward on the network hierarchy. An example, hierarchy may be as shown below:

User Device>Customer Edge>Network Edge>Network Core & Peering>Datacenter/Cloud

However, most 5G enabled edge computing resources may have limited computing (server, storage, network) capacity. Further, these edge computing resources cannot be upgraded, or replaced in a short duration. It may be noted that utilization of an edge node may shoot up and down based on combination of a number of devices the edge node may be serving and an application the edge node may be serving at any moment of time. As such, the edge computing service is susceptible to break down if the edge nodes are not able to handle the processing needs due to overloaded conditions, such as during a sudden capacity burst scenario of large number of requests from user devices (for example, in a scenario of a large crowd gathered for an event, etc.). Moreover, these capacity burst scenarios may be unpredictable.

A classical approach to handle such scenarios is planning for the worst-case scenarios, and deploy a number of edge nodes or a size of the edge node to maximum possible threshold that can be anticipated. By way of an example, there are close to 500,000 towers in India that act as potential edges. This figure is expected to scale ten times by the year 2022, by when 5G is expected to be fully operational. A provisioning of worst-case scenario across the globe may be a huge waste of money and waste of resources like power, space and environment. Moreover, a variety of innovative edge devices may be developed, and the nature of these edge devices can't be exactly predicted. It may be interesting to note that many edge computing hardware and edge computing platform are getting standardized around commodity x86, Arm-based hardware, and Linux-based container platform, like Kubernetes. The standardization around these commodities may give an opportunity for telecommunication companies (telcos) to use the edge hardware and the edge platform capacity from third party resources which may be ready to provide their customer unit (CU) to these telcos on an on-demand basis. These third party resources could be individuals, small business, or larger corporates running a computing resource sharing business.

SUMMARY

In one embodiment, a method of sharing an edge computing resource is disclosed. In an embodiment, the method may include receiving from one or more lessor edge computing resources, one or more first requests for presenting an availability of the one or more lessor edge computing resources. The method may further include receiving from a lessee edge computing resource, a second request for availing at least one lessor edge computing resource from the one or more lessor edge computing resources. The method may further include, upon receiving the second request, presenting the one or more first requests corresponding to the one or more lessor edge computing resources, to the lessee edge computing resource. The method may further include receiving from the lessee edge computing resource, a selection of a first request from the one or more first requests, and creating a connection between the lessee edge computing resource and the lessor edge computing resource corresponding to the received selection.

In another embodiment, a sharing device for sharing an edge computing resource is disclosed. The sharing device includes a processor and a memory communicatively coupled to the processor. The memory stores processor instructions, which, on execution, may cause the processor to receive from one or more lessor edge computing resources, one or more first requests for presenting an availability of the one or more lessor edge computing resources. The processor instructions, on execution, may further cause the processor to receive from a lessee edge computing resource, a second request for availing at least one lessor edge computing resource from the one or more lessor edge computing resources, and upon receiving the second request, present the one or more first requests corresponding to the one or more lessor edge computing resources, to the lessee edge computing resource. The processor instructions, on execution, may further cause the processor to receive from the lessee edge computing resource, a selection of a first request from the one or more first requests, and create a connection between the lessee edge computing resource and the lessor edge computing resource corresponding to the received selection.

In yet another embodiment, a non-transitory computer-readable storage medium is disclosed. The non-transitory computer-readable storage medium has stored thereon, a set of computer-executable instructions causing a computer comprising one or more processors to perform steps including receiving from one or more lessor edge computing resources, one or more first requests for presenting an availability of the one or more lessor edge computing resources. The steps may further include receiving from a lessee edge computing resource, a second request for availing at least one lessor edge computing resource from the one or more lessor edge computing resources. The steps may further include, upon receiving the second request, presenting the one or more first requests corresponding to the one or more lessor edge computing resources, to the lessee edge computing resource. The steps may further include receiving from the lessee edge computing resource, a selection of a first request from the one or more first requests, and creating a connection between the lessee edge computing resource and the lessor edge computing resource corresponding to the received selection.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
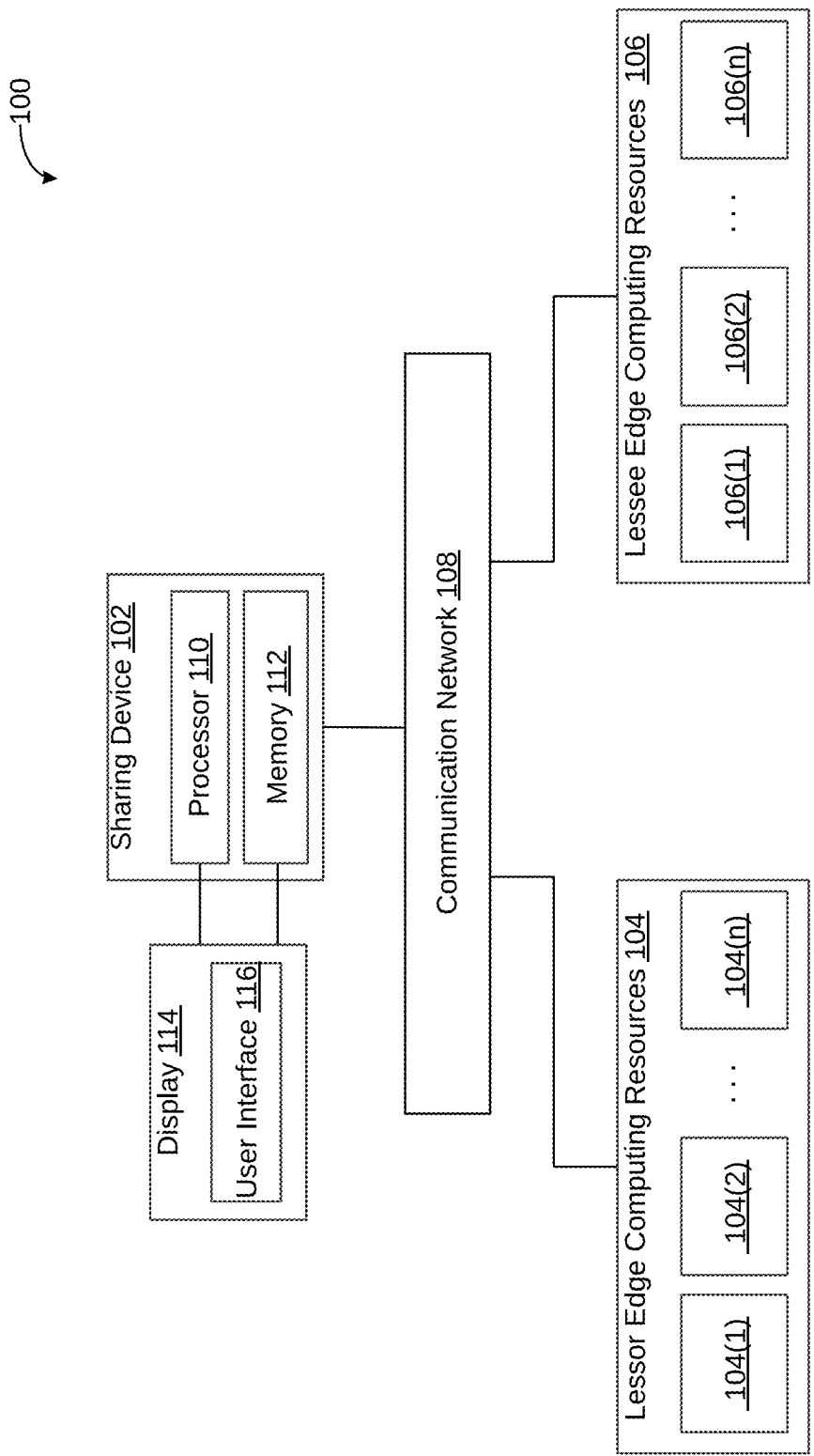
FIG. 1 is a block diagram of a system for sharing an edge computing resource, in accordance with an embodiment.

In one embodiment, a system 100 for sharing an edge computing resource is illustrated in the FIG. 1, in accordance with an embodiment. The system 100 may include a sharing device 102. The system 100 may further include one or more lessor edge computing resources 104(1), 104(2) . . . 104(3), hereinafter collectively referred to as one or more lessor edge computing resources 104 (the reference numeral 104 is used interchangeably for the one or more lessor edge computing resources and a lessor edge computing resource from the one or more lessor edge computing resources). The system 100 may further include one or more lessee edge computing resources 106(1), 106(2) . . . 106(3), hereinafter collectively referred to as one or more lessee edge computing resources 106 (the reference numeral 106 is used interchangeably for the one or more lessee edge computing resources and a lessee edge computing resource from the one or more lessee edge computing resources). It may be noted that the one or more lessor edge computing resources 104 may be available for leasing out by one or more lessee edge computing resources 106. The sharing device 102 may be a computing device having data processing capability.

In particular, the sharing device 102 may have capability for providing a platform for allowing the one or more lessee edge computing resources 106 to use (by leasing) computing capacity of the one or more lessor edge computing resources 104. Examples of the sharing device 102 may include, but are not limited to a server, a desktop, a laptop, a notebook, a netbook, a tablet, a smartphone, a mobile phone, an application server, a sever, or the like. The one or more lessee edge computing resources 106 and the one or more lessor edge computing resources 104 may be communicatively coupled to the sharing device 102 via a communication network 108. The communication network 108 may be a wired or a wireless network and the examples may include, but are not limited to the Internet, Wireless Local Area Network (WLAN), Wi-Fi Long Term Evolution (LTE), Worldwide Interoperability for Microwave Access (WiMAX), and General Packet Radio Service (GPRS).

As will be described in greater detail in conjunction with FIG. 2 to FIG. 10, in order to share the edge computing resources, the sharing device 102 may receive from the one or more lessor edge computing resources 104, one or more first requests for presenting an availability of the one or more lessor edge computing resources 104. The sharing device 102 may further receive from a lessee edge computing resource 106, a second request for availing at least one lessor edge computing resource from the one or more lessor edge computing resources 104. Upon receiving the second request, the sharing device 102 may further present the one or more first requests corresponding to the one or more lessor edge computing resources 104, to the lessee edge computing resource 106. The sharing device 102 may further receive from the lessee edge computing resource 106, a selection of a first request from the one or more first requests. Upon receiving the selection, the sharing device 102 may further create a connection between the lessee edge computing resource 106 and the lessor edge computing resource 104 corresponding to the received selection.

In order to perform the above discussed functionalities, the sharing device 102 may include a processor 110 and a memory 112. The memory 112 may store instructions that, when executed by the processor 110, cause the processor 110 to allow sharing of edge computing resources, as discussed in greater detail in FIG. 2 to FIG. 10. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., first requests data, second request data, selection data, authentication data, secure connection tunnel data, predetermined time period data, bill, search data, parameter data, etc.) that may be captured, processed, and/or required by the system 100.

The sharing device 102 may further include one or more input/output devices 114 through which the sharing device 102 may interact with a user and vice versa. By way of an example, the input/output device 114 may be used to display to a lessee the one or more lessor edge computing devices available for hiring. The system 100 may interact with one or more external devices 118 over the communication network 108 for sending or receiving various data. Examples of the one or more external devices 118 may include, but are not limited to a remote server, a digital device, or another computing system.

Figure 2:
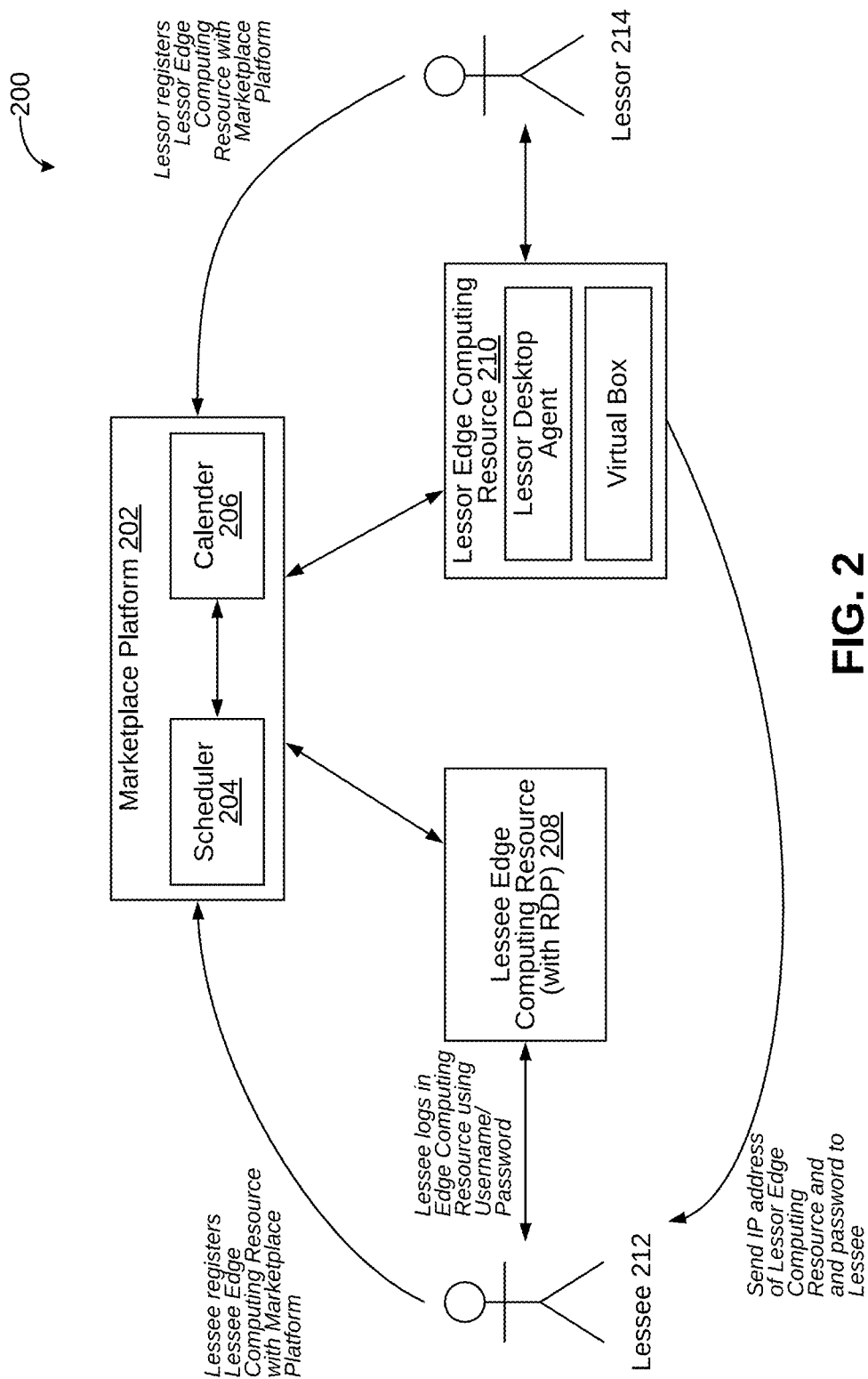
FIG. 2 is a functional block diagram of a system for sharing edge computing resources, in accordance with an embodiment.

Referring now to FIG. 2, a functional block diagram of a system 200 for sharing edge computing resources is illustrated, in accordance with an embodiment of the present disclosure. In some embodiments, the system 200 may include a marketplace platform 202 (also, referred to as sharing platform 202). In some embodiments, the marketplace platform 202 may be implemented by the sharing device 102. This marketplace platform 202 may enable public participation for fulfilling an edge computing requirement of a lessee 212, by allowing the lessee to avail a lessor edge computing resource 210 made available by a third party (i.e. a lessor 214) in form of Virtual Machines (VM), that a Telco (or any other party) may schedule and consume. The marketplace platform 202 may be supported by a central repository (not shown in FIG. 2) of an edge computing resource with a semantic ontology capable of reasoning. The central repository may include details about each of the lessor edge computing resources 210. Further, the central repository may be linked to predefined categorization of the marketplace platform 202, model details, usage scenarios, remote access logics, automation BOTS etc., so as to allow seamless remote access to control the lessor edge computing resources 210.

It may be understood that with a large set of concurrent requests, it may be difficult to wake-up at the right time and initiate the interaction between both the parties (i.e. lessor edge computing resources 210 and lessee edge computing resources 208). To this end, the marketplace platform 202 may include a scheduler 204 which may track all the requests. When all conditions match (for example, the second request matches the first request), the scheduler 204 may automatically initiate a right set of scripts from the central repository, and trigger them to start associated activities. In some embodiments, the lessor 214 may register the lessor edge computing resource 210 with the marketplace platform 202, and accordingly, an entry may be made in the calendar 206 of the marketplace platform 202.

It may be noted that the edge computing resource (ED), i.e. the lessor edge computing resources 210, may have to be prepared to avoid mismatches which may prevent a remote customer unit (CU), i.e. lessee edge computing resources 208, from interfacing. In some embodiments, a set of predefined virtual machine (VM) images may be provided by the marketplace platform 202. Alternately, the CU may bring its own VM image. The VM image may be matched with a checksum and then loaded on the ED.

In some scenarios, the ED may be intruded by workload, which may lead to a security breach in some parts of the ED, or of the third party's surrounding environment. The workload may be running in a secured sandbox in the form of a VM or a container, which may restrict a kind of access the workload will have on the ED or outside it. To this end, the marketplace platform 202 may authorize a set of authorized third-party sandboxes. The right CU (i.e. lessee edge computing resource 208) may have to be reached, and workload started to avoid wastage of time. The marketplace platform 202 may include details of all the CUs registered and the mode of contacts. A subcomponent of the marketplace platform 202, when triggered by the scheduler 204, may narrow down the CU, obtain the right contact details of the CU, and wakeup the CU (e.g. using mobile SMS, Email, IVR, and customized smartphone app).

In some embodiments, in order to prevent a wrong CU (for example, a hacker) gain access to the ED that is prepared to accept new work, the scheduler 204 may generate a one-time-password (OW) that will be specific to the transaction. This will be sent only to the identified CU contact (for example, on a lessee's mobile phone) using a mode of communication. Further, the marketplace platform 202 may independently track a successful initiation of the workload tracked, and log the usage.

A Transmission Control Protocol (TCP) tunnel may be established using a central tunneling service from the ED, when the CU successfully logs in. Further, a metered usage may be tracked at the central tunneling service. The metered usage may then be updated at the marketplace platform 202. A workload tracking (WT) module (not shown in FIG. 2) may track every transaction running concurrently, revoke CU access after prescribed time, and revoke all access to ED. The WT module may further trigger a graceful closure request when the scheduled time ends. A predefined closure automation script may be triggered on the ED. This may stop the VM image and transfer image back to the user repository (UR). Alternately, a std out or VM screen may be transferred to the UR. The ED may be restored for future use. A VM instance terminate request may be issued at the ED and the status may be passed back to the WT.

In some embodiments, service quality may be accessed and a rating of the ED, the third party, and the CU may be awarded, as an indication of reputation. To this end, for example, the marketplace platform 202 may issue a transaction closing form for awarding the rating, that has to be filled by the CU and the third party. For example, the rating may be in form of stars (e.g. 5-star rating being the best). The WT module may populate the score of the ratings. This score may be algorithmically used for deriving the reputation of the parties and the ED.

It may be noted that a financial transaction may have to be completed, to ensure there is a non-disputed settlement between the parties for this transaction. The final stage of the workload tracking may include determination of the financial entitlement. In some embodiments, the entitlement may be loaded into a wallet service of the marketplace platform 202, that may be subsequently settled in bank accounts. Further, in some embodiments, a Blockchain-based settlement may be optionally be made available.

Figure 3A:
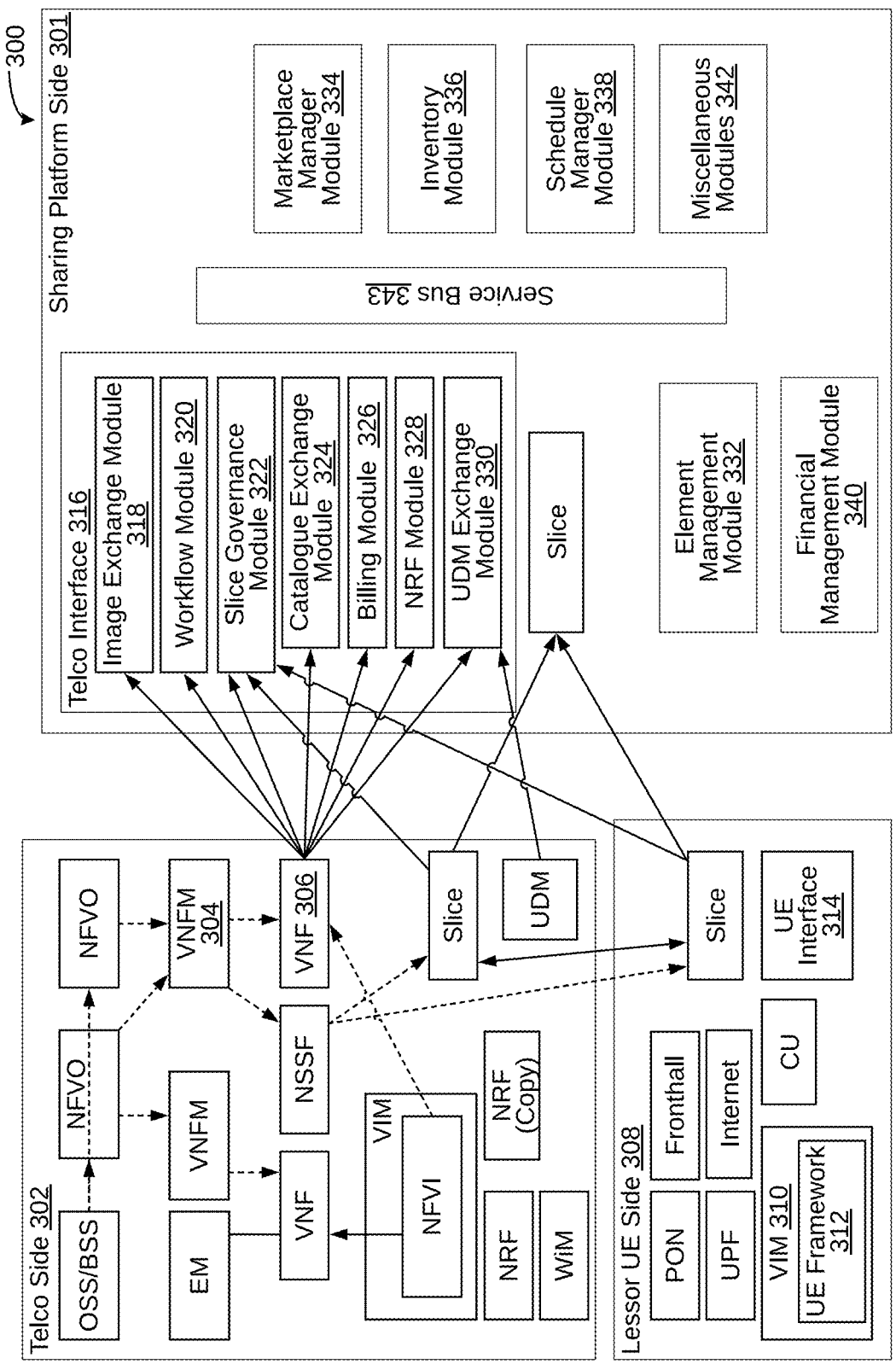
FIG. 3A is a functional block diagram of a system for sharing an edge computing resource, in accordance with another embodiment.

Referring now to FIG. 3, a functional block diagram of a system 300 for sharing an edge computing resource is illustrated, in accordance with an embodiment. The system 300 may include a sharing platform side 301, a Telco side 302, and a lessor UE side 308. The Telco side 302 may include a Virtual Network Functions (VNF) module 304 (at the core of Network Functions Virtualization (NFV)) which may handle specific network functions to securely connect traffic from a user equipment (UE) to another UE or the Telco's internal network. The Telco side 302 may further include one or more individual VNFs 306 which may be connected or combined together as building blocks to create a fully virtualized environment. It may be noted that VNFs 306 may run on virtual machines (VMs) suitably placed in the Telco network on top of the hardware networking infrastructure. There can be multiple VMs on one hardware box or implemented as containers or configurable physical machine.

The lessor UE side 308 may include a Virtual Infrastructure Manager (VIM) 310. The lessor UE side 308 may further include a UE framework 312 and a UE interface 314. The UE framework 312 may manage the lifecycle of VMs and related components in the UE. The VIM 310 may be received from a variety of vendors, for example, Oracle Virtual box, Docket for Windows, VMWare workstation, Parallels etc. The UE Interface 314 residing in the UE side 308 may work like an agent, and may manage the network tunnel and communication in and out of the UE.

The sharing platform side 301 may include a Telco Interface 316. The Telco Interface 316 may include different modules which may be connected with telecommunication service providers and the lessor UE side 308. In some embodiments, Telco Interface 316 may include an image exchange module 318, a workflow module 320, a slice governance module 322, a catalogue exchange module 324, a billing module 326, an NRF module 328, and a Unified Data Management (UDM) exchange module 330.

The image exchange module 318 may provide a set of certified VM images that can be spawned at various edges. Each image may be tagged and can be used for specific workload needs. The workflow module 320 may act as an orchestrator which may use workflows during the lifecycle activities. The workflow module 320 may interface with a workflow engine. The workflows may be triggered during the design time or the runtime. It may be noted that the VNF may need day 1 and day 2 administration. The slice governance module 322 may provide this administration to the Telco side. The catalogue exchange module 324 may act as an internal catalogue. This module may have a set of secured services that may be ready, and with an associated image that can be instantiated. The billing module 326 may track the usage of the UE through monitoring a slice module and VNF interfaces to a recurring billing module 382 (discussed later). The NRF module 328 may maintain a registry of all the NFV and provide registration and discovery of network function (NF) and service to realize. The UDM exchange module 330 may provide unified data repository for all the components.

The sharing platform side 301 may further include an element management module 332, a marketplace module 334, an inventory module 336, a schedule manager module 338, a financial manager module 340, and other miscellaneous modules 342. Further, a service bus 343 may act as a common enterprise service bus, so as to provide a common interface to all the services and make the entire service a Service-oriented architecture (SOA), These modules are further explained in conjunction with FIG. 3B.

Figure 3B:
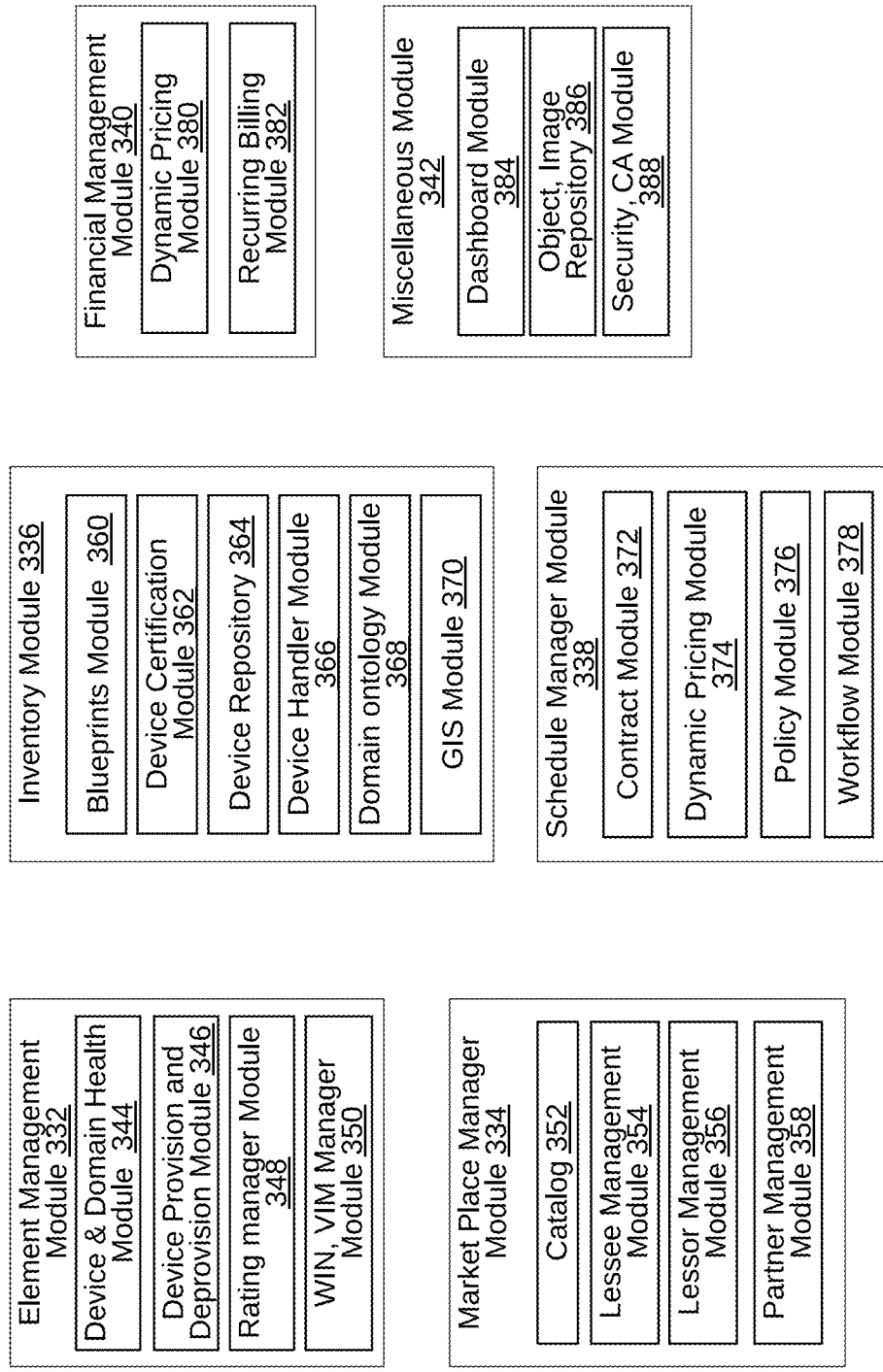
FIG. 3B is a block diagram of a sharing platform side showing one or more modules, in accordance with an embodiment.

Referring now to FIG. 3B, one or more modules of the sharing platform side 301 are illustrated, in accordance with an embodiment. The element management module 332 may include a device and domain health module 344, a device provision and deprovision module 346, a rating manager module 348, and a WIN, VIM manager module 350.

The device and domain health module 344 may be responsible for closing loop monitor of the components running in the distributed environment. The device and domain health module 344 may further keep the health of the overall service to a desired state. The device provision and deprovision module 346 may handle the device provisioning lifecycle for each instantiation of the VNF/CNF at the respective location in the edges of the network. The device provision and deprovision module 346 may further reconcile the UDM and other inventory data. The rating manager module 348 may act as a rating engine that may algorithmically maintain ratings of every user based on the previous performance. For example, the ratings may be derived based on consolidated fulfillment of transactions, based on one or more factors. The one or more factors may include an uninterrupted service, a link performance, a performance of UE, a device model, a financial settlement, a geographical rating, etc. The WIN, VIM manager module 350 may work closely with the device and domain health module 344, The WIN, VIM manager module 350 may perform various automation and lifecycle activities related to open loop operations, ticketing, change management, configuration changes etc.

The marketplace module 334 may include a catalog 352, a lessee management module 354, a lessor management module 356, and a partner management module 358. The catalog 352 may provide a consuming party an access to discovery of a variety of current suppliers and their products. The catalog 352 may further provide a place to compare products and then to schedule what suits their needs easily, quickly and cost effectively. The lessee management module 354 may control onboarding, KYC, off-boarding, accounting, administrative, and operational requirements associated with the lessee. The lessor management module 356 may control onboarding, KYC, off-boarding, accounting, administrative, and operational requirements associated with the lessor. The partner management module 358 may control onboarding, KYC, off-boarding, accounting, administrative, and operational requirements associated with together partners who may be adding value in the supply chain, for example a physical provisioning, a KYC verification, a financial fulfillment, a survey etc.

The inventory module 336 may include an blueprints module 360, a device certification module 362, a device repository 364, a device handler module 366, a domain ontology module 368, and a geographic information system (GIS) module 370. The blueprints module 360 may maintain approved and tested declarative configuration, based on use cases, set of CE Hardware and Software, and ED. The device certification module 362 may act as an offline service that may be used to maintain the inventory of device with third party certification as assurance of device performance. The device repository 364 may store records of all devices available in the market and possibility of current and future usage. This may be maintained by sourcing information from various third-party stores and suppliers. The device handler module 366 may be configured to handle a broad range of devices which may include a physical computer, a VM, containers, mini cells, and towers. The device handler module 366 may further manage all aspects of the various handling scenarios that may involve fully automated lifecycle, semi-automated lifecycle (that may include some manpower), and fully manual handling.

The domain ontology module 368 may include knowledge representation of the Telco domain and extension to the business model with its set of concepts and relations. This notion may present handy semantic solutions for various usage areas leveraging semantic web, information retrieval, and question answering. The GIS module 370 may be configured to capture, store, manipulate, analyze, manage, and present spatial or geographic data related to the lessee, lessor, devices, network, towers and cells. The modules may allow users to create interactive queries, analyze spatial information, edit data in maps, and present the results of all these operations.

The schedule manager module 338 may include a contract module 372, a dynamic pricing module 374, a policy module 376, and a workflow module 378. The contract module 372 (also called contract lifecycle management module) may manage contracts from the lessee, the lessor, and the partners. The contract module 372 may further provide the parties with contract lifecycle which may cover any process that contributes, creates, or utilizes contract data. The dynamic pricing module 374 may respond in real-time to changes in competitive prices, product demand and market conditions providing the parties improvements in revenue, margin and customer loyalty. The policy module 376 may allow an organization to create, monitor and enforce rules about network resources, organization's policy, and criterion for engagement. The workflow module 378 may manage business processes. The workflow module 378 may play a key role in workflow technology, service management, device provisioning, de-provisioning, KYC etc.

The financial management module 340 may include a dynamic pricing module 380 and a recurring billing module 382. The dynamic pricing module 380 may respond in real-time to changes in competitive prices, product demand and market conditions providing the parties improvements in revenue, margin and customer loyalty. The recurring billing module 382 may automatically charge the party based on usage of the UE, and settle an entitlement to the provider party. A tracking may be determined through the metrics from slice and UE interface, VNF module for every transaction.

The miscellaneous modules 342 may include a dashboard module 384, an object and image repository 386, and a security module 388. The dashboard module 384 may to monitor all relevant service KPIs in an easy and accessible way. The dashboard module 384 may be relevant for agents, lessee, lessor, management executives at the same time, may help to generate a 360-degree view, and may help to improve the service team performance. The object and image repository 386 may act as an inventory of all the ED, NFV instances, availability, schedule etc. The object and image repository 386 may further act as a constitute relational database with domain specific schema, state sync modules, real-time data bridges, FSM, and digital twin of ED. The security module 388 may govern a set of tools and process. The security module 388 may act as a dedicated security operations center that deals with security issues in the modules at a technical level. An on-duty staff may supervise the system and may react to any alerts to fix them before these can threaten the system.

Further, a user interface may be provided for the edge and fog marketplace. This user interface may help in leasing and lending of devices over the network.

Figure 4:
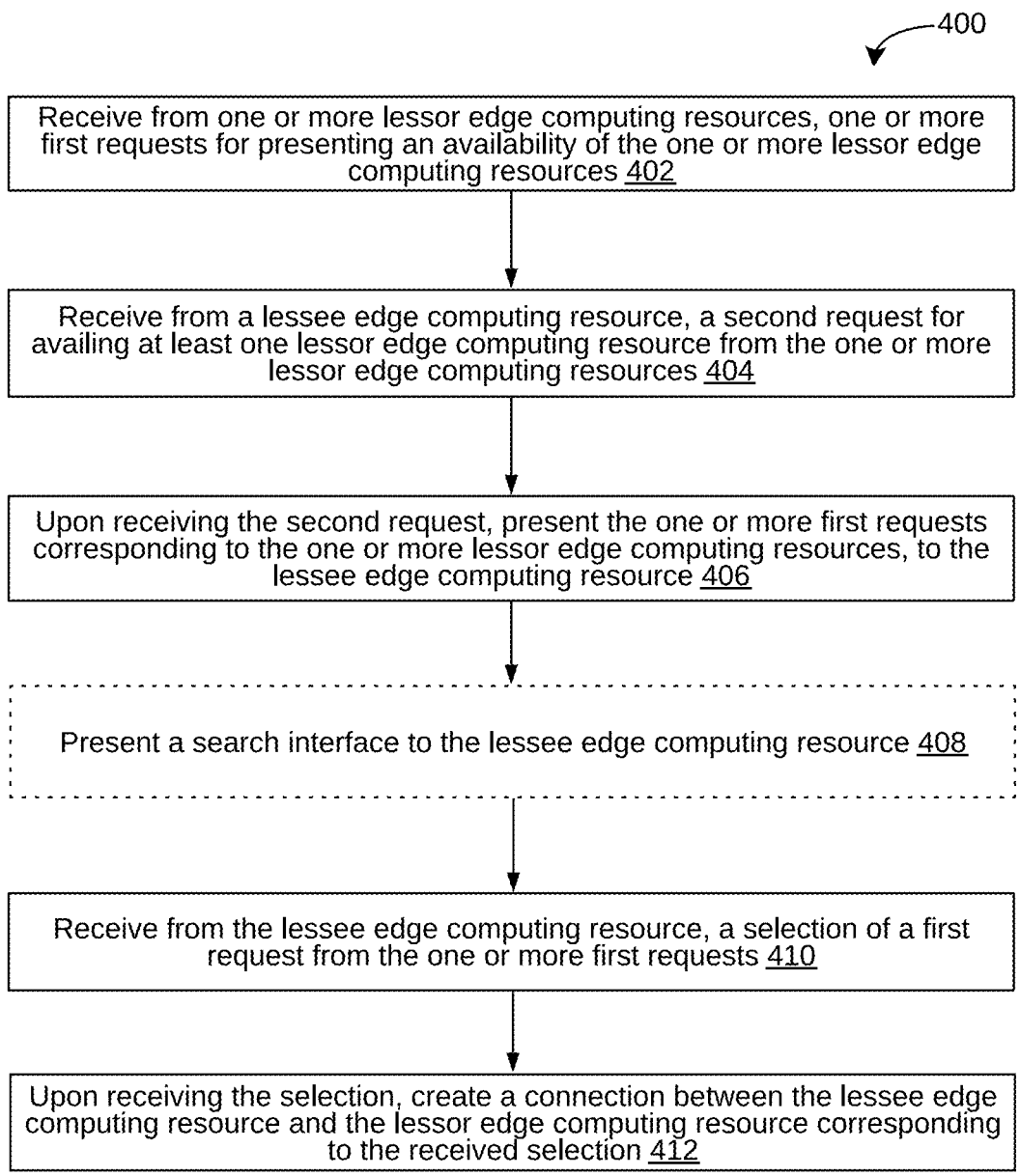
FIG. 4 is a flowchart of an overview method of sharing an edge computing resource, in accordance with an embodiment.

Referring now to FIG. 4, a flowchart of an overview method 400 of sharing an edge computing resource is illustrated, in accordance with an embodiment of the present disclosure. In some embodiments, the method 400 may be performed by the sharing device 102 that may implement a sharing platform.

At step 402, one or more first requests may be received from one or more lessor edge computing resources for presenting an availability of the one or more lessor edge computing resources. At step 404, a second request may be received a lessee edge computing resource for availing at least one lessor edge computing resource from the one or more lessor edge computing resources. At step 406, upon receiving the second request, the one or more first requests corresponding to the one or more lessor edge computing resources may be presented to the lessee edge computing resource.

Additionally, at step 408, a search interface may be presented to the lessee edge computing resource. The search interface may provide for discovery of the one or more lessor edge computing resources, based on one or more parameters associated with the one or more lessor edge computing resources. By way of an example, the one or more parameters may include a computing capacity associated with each of the one or more lessor edge computing resources, an availability of each of the one or more lessor edge computing resources, and a cost associated with each of the one or more lessor edge computing resources.

At step 410, a selection of a first request from the one or more first requests may be received from the lessee edge computing resource. At step 412, upon receiving the selection, a connection may be created between the lessee edge computing resource and the lessor edge computing resource corresponding to the received selection. The creation of the connection is further explained in detail in conjunction with FIG. 5.

Figure 5:
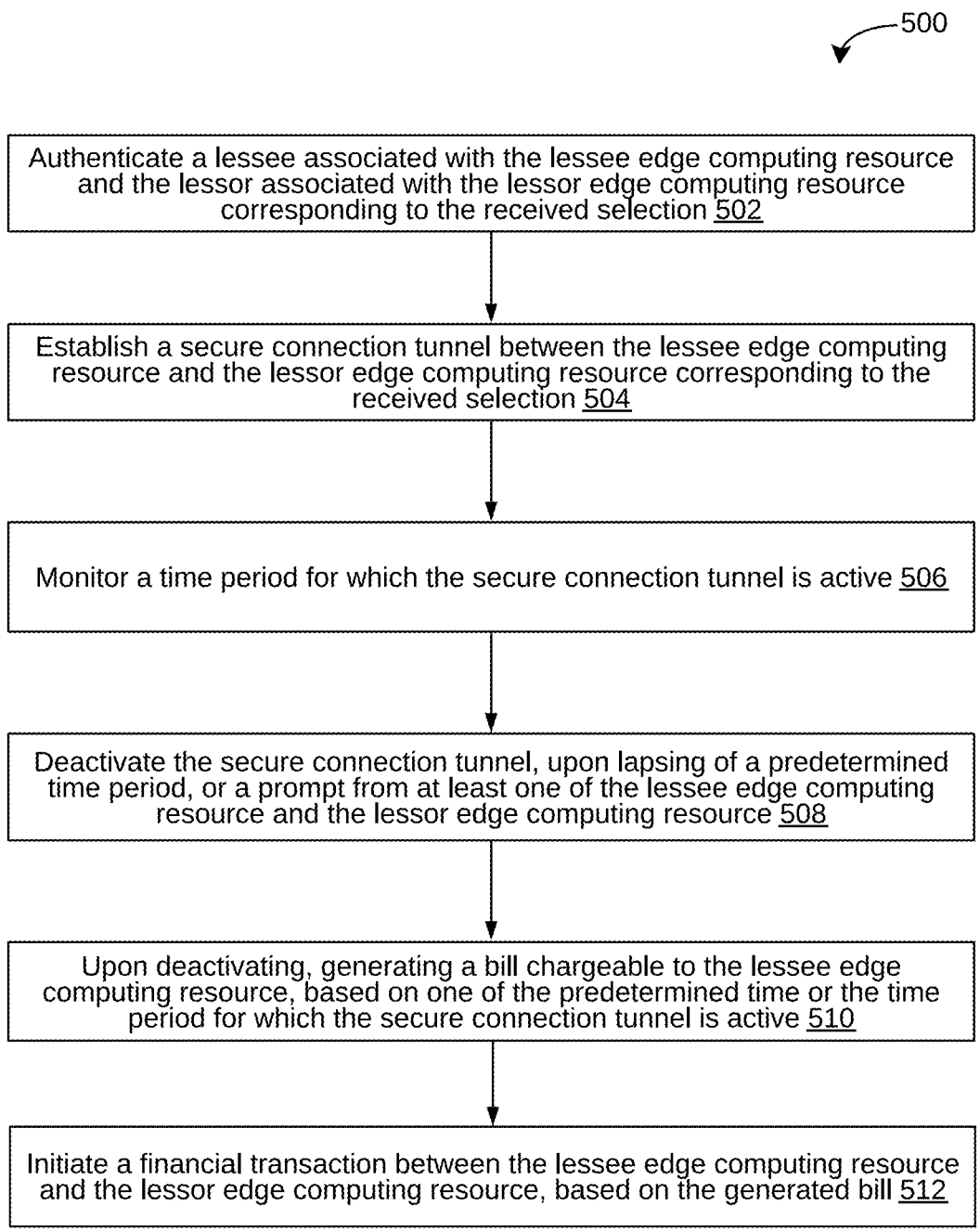
FIG. 5 is a flowchart of a method of creating a connection between a lessee edge computing resource and a lessor edge computing resource corresponding to the received selection, in accordance with an embodiment.
Figure 6:
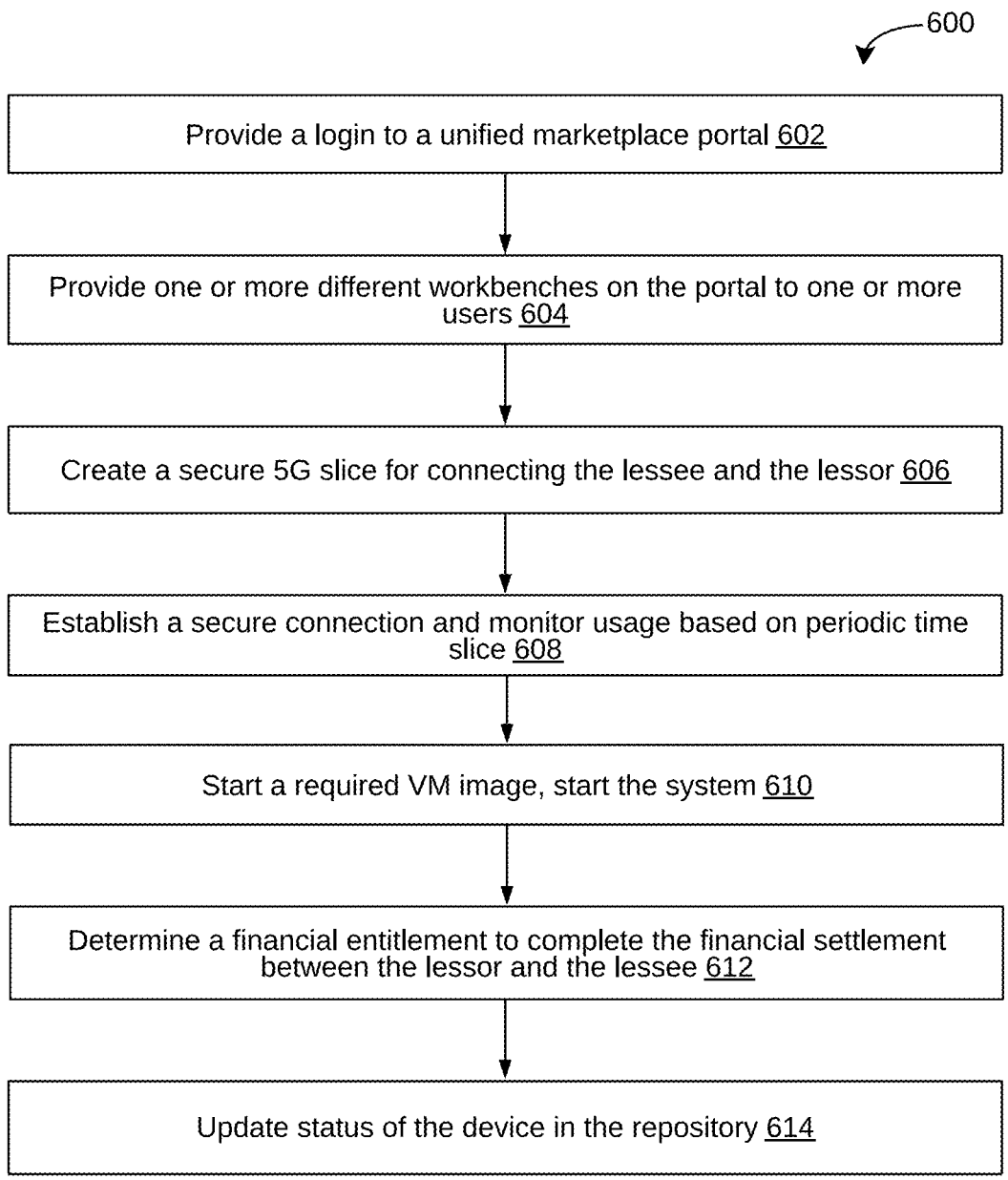
FIG. 6 is a flowchart of a detailed method of sharing an edge computing resource, in accordance with an embodiment.

Referring now to FIG. 5, a flowchart of a method 500 of creating a connection between the lessee edge computing resource and the lessor edge computing resource corresponding to the received selection is illustrated, in accordance with an embodiment of the present disclosure.

At step 502, upon receiving the selection of a first request from the lessee edge computing resource, a lessee associated with the lessee edge computing resource may be authenticated. Similarly, the lessor associated with the lessor edge computing resource corresponding to the received selection may be authenticated. In some embodiments, the authenticating may be two factor-based. Further, the authenticating may include authenticating via a Short Messaging Service (SMS) and authenticating via an online service. For example, each of the lessee and the lessor may be sent an SMS on their registered mobile phone numbers, for authenticating.

At step 504, a secure connection tunnel may be established between the lessee edge computing resource and the lessor edge computing resource corresponding to the received selection. At step 506, a time period for which the secure connection tunnel is active may be monitored. At step 508, the secure connection tunnel may be deactivated. It may be noted that the secure connection tunnel may be deactivated either upon lapsing of a predetermined time period, or against a prompt from the lessee edge computing resource or the lessor edge computing resource. For example, a lessee may choose a predetermined time period for which the lessee may want to avail the lessor edge computing resource, at the time of providing the selection of the lessor edge computing resource. Accordingly, the secure connection tunnel may be deactivated after the predetermined time period has lapsed. Alternately, each of the lessor and the lessee may be provided an option to terminate the connection prematurely, as per their requirement, thereby deactivating the secure connection tunnel.

At step 510, upon deactivating, a bill chargeable to the lessee edge computing resource may be generated. For example, the bill may be generated based on the predetermined time or the time period for which the secure connection tunnel is active. In other words, if the connection is terminated prematurely, the lessee may be charged only for the time period for which the secure connection tunnel is active. At step 512, a financial transaction may be initiated between the lessee edge computing resource and the lessor edge computing resource, based on the generated bill. As such, the lessee may transfer an amount to the lessor as per the bill, for example, via a banking transaction Referring now to FIG. 6, a flowchart of a detailed method 600 of sharing an edge computing resource is illustrated, in accordance with an embodiment of the present disclosure. By way of an example, the method 600 may include one or more steps for fullfilling a request from lessee (second request) related to infrastructure or computing requirements.

At step 602, a login to a unified marketplace portal (also, referred to as sharing platform) may be provided. It may be noted that when device access is requested from a lessor by a lessee, the unified marketplace portal may provide a secure login to the lessee. At step 604, one or more different workbenches may be provided on the portal to one or more users, based on their respective roles. For example, the roles may include role of a lessor, a lessee, or a partner. The unified marketplace portal may provide the different workbenches on the portal, based on the respective roles. In some embodiments, upon allocating the workbench, a search interface may be provided. The search interface may be presented to the lessee to narrow down on lessor's devices to hire. Furthermore, a dynamic status of the lessor devices which may be available for hiring may be presented from an object repository.

At step 606, a secure 5G slice may be created for connecting the lessee device and the lessor device. After the lessee identifies lessor devices, the lessee may request for lessor device access. In some embodiments, upon receiving the access request, a secure two-factor based authentication may be performed for authenticating the lessor and the lessee. For example, the authentication may be performed through a short message services (SMS), and/or via an online medium. Once the authentication is carried out, a secure communication link may be created between lessor and lessee using communication slice. The secure link which is created between lessor and lessee may be provisioned from the NFVO. After the provisioning and establishment of the connection, a secure connection tunnel may be placed between the lessor device and the lessee device. The secured tunnel may be derived from the ontology and system. Upon placing the secure tunnel, a secure TLS tunnel may be established between the lessor device and lessee device through the VNF.

At step 608, a secure connection may be established and the usage may be monitored based on periodic time slice. The metering may be provisioned from the user interface. At step 610, a required VM image may be started, and the system may be started. After establishing the connection and metering the usage on a periodic time slice, VM image may be created, and sharing of the resources may be started. In some embodiments, one or more agents may be used to fully automate the lifecycle for remote access. At step 612, on completion, a financial entitlement may be determined to complete the financial settlement between the lessor and the lessee. At step 614, status of the device may be updated in the repository. Further, a next sharing decision may take place, based on status update.

Use Case Example 1

As it will be appreciated, advancements in interactive tele-immersion technology are expected to redefine sports broadcasts and its viewer participation experience. The tele-immersion, however, is computation heavy, as it requires large scale raster to vector conversion to be performed on high resolution in real-time video streams. A challenge for tele-immersion providers may be to provision large scale computing at close proximity of the sports events (e.g. a stadium). This large-scale computing has to be built at the stadium or in proximity to the stadium. Alternately, this large-scale computing may be consumed from edge computing resources provided by local Telcos. As such, even though this may be an opportunity for the Telcos, however, the Telcos may be challenged by a monetizing model, as the Telcos may have to provision an edge capacity for events that may happen only few times a year To this end, the above disclosed techniques which may be implemented as a platform, may leverage Automation (stack and task), Algorithmic reasoning, geo intelligence, probabilistic modeling and forecasting, gamification, bidding, analytics, immutable blockchain based scheduling and financial settlement, to allow sharing of computing capacity between a edge devices.

Figure 7A:
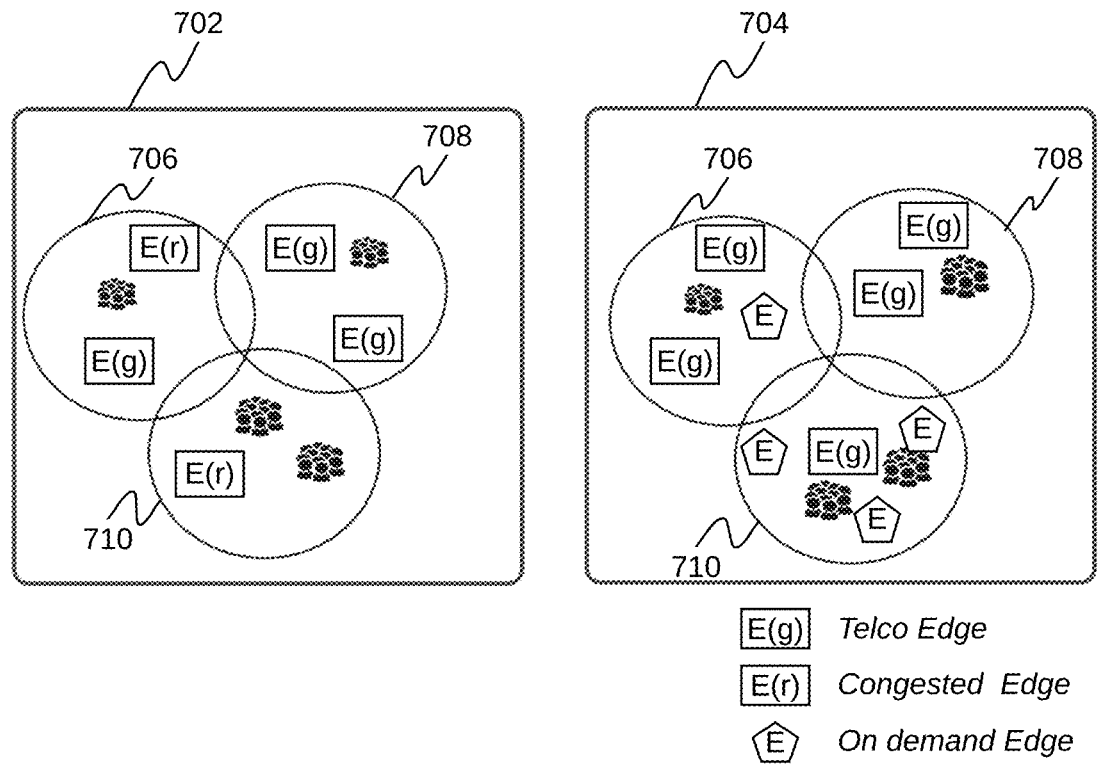
FIG. 7A illustrates an exemplary first scenario with enough computing capacity and an exemplary second scenario with unmet computing capacity for tele-immersion, in accordance with an embodiment.

Referring now to FIG. 7A, an exemplary first scenario 702 with enough computing capacity and a second exemplary scenario 704 with unmet computing capacity for tele-immersion, are illustrated. In the first scenario 702, one more spatial zones may have shortage of computing capacity, i.e. requirement is unmet with telco edges, and in the second scenario 704, the spatial zones may have sufficient computing capacity, i.e. requirement is met using on-demand edges. For example, in the first scenario 702, a second spatial zone 708 may have enough computing capacity afforded by its two telco edges (e(g)). However, a first spatial zone 706 and a third spatial zone 710 may not have enough computing capacity afforded by its two and one, respectively telco edges. As a result, each of the first spatial zone 706 and the second spatial zone 710 may have one congested edge (e(r)). However, in the second scenario 704, the unmet requirement of the first spatial zone 704 and the third spatial zone 710 may be met upon adding one and three, respectively on-demand edges.

Figure 7B:
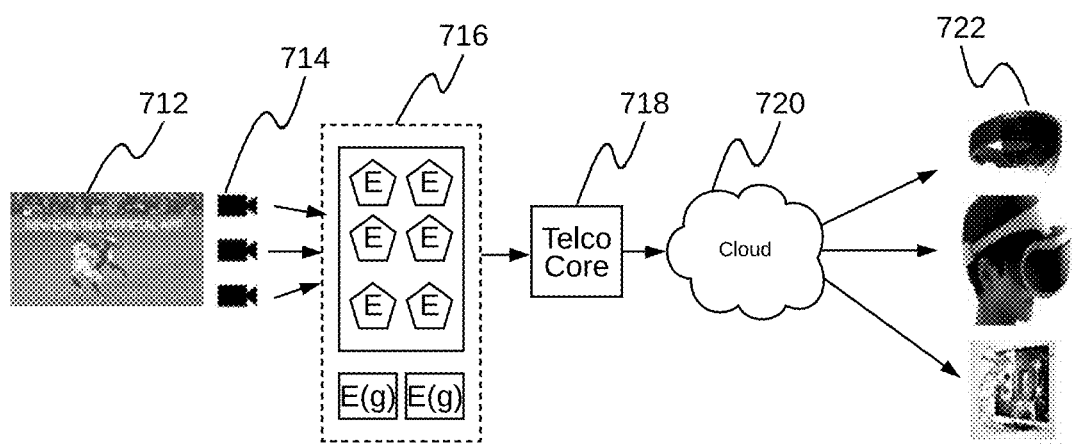
FIG. 7B illustrates an exemplary process of meeting requirement of computing capacity in a spatial zone by adding on-demand edges for tele-immersion, in accordance with an embodiment

Referring now to FIG. 7B, an exemplary process of meeting requirement of computing capacity in a spatial zone by adding on-demand edges for tele-immersion is illustrated. A high-resolution video (e.g. 8 k video) 712 may be obtained from a sports arena using one or more video cameras 714. Thereafter, the high-resolution video 712 may be processed, using a set of edges 716. As shown, the requirement of the computing capacity for processing the high-resolution video may be met upon adding one or more on-demand edges to one or more telco edges already available in the spatial zone. A processed high-resolution video may be sent to a telco core 718 and later to a cloud 720 for broadcasting. From the cloud 720, the processed high-resolution video may be broadcast through one or more tele-immersion devices 722, for example, a VR set, a 3D TV, etc.

The above disclosed techniques provide for an alternate approach for use by the tele-immersion players, where a lessor's device (e.g. a personal Computer or a custom server infrastructure) may be consumed over-the-wire by a tele-immersion service provider to do a near real-time video processing in the proximity of the stadium.

Figure 8:
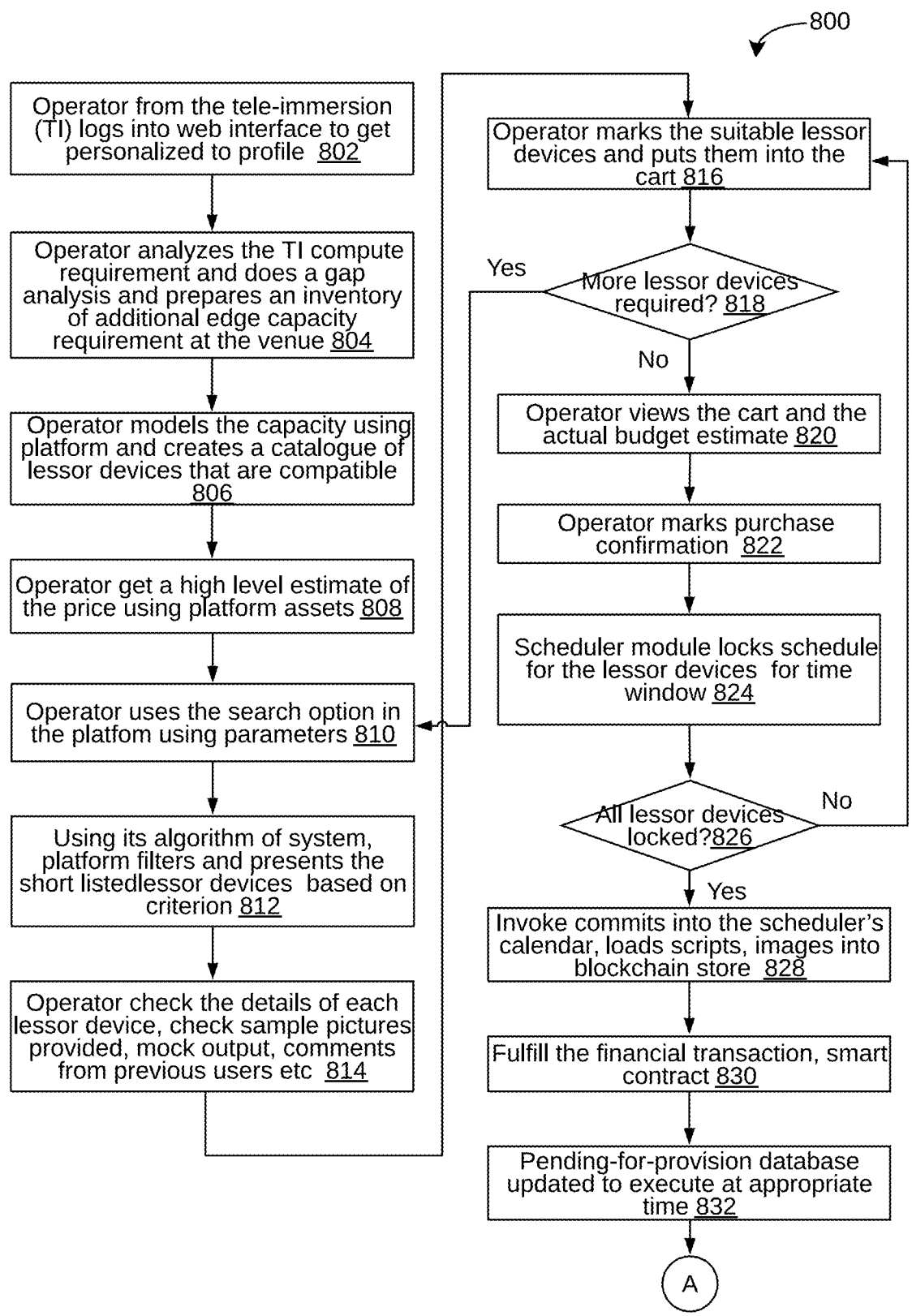
FIG. 8 is a flowchart of an exemplary method of sharing edge computing resources for tele-immersion, in accordance with an embodiment.

Referring now to FIG. 8, a flowchart of an example method 800 of sharing edge computing resources for tele-immersion is illustrated. At step 802, an operator from a tele-immersion (TI) site may log into a sharing platform. In some embodiments, the sharing platform may be implemented in the sharing device 102. Further, the operator may login via a web interface to get a personalized profile. At step 804, the operator may analyze a computing requirement of the TI site. Accordingly, the operator may perform a gap analysis, and may prepare an inventory of additional edge computing capacity requirement at the TI site. At step 806, the operator may model the computing capacity using the sharing platform, and may create a catalogue of available edge devices that are compatible.

At step 808, the operator may obtain a high-level estimate of the associated cost. The operator may obtain this cost using the sharing platform. At step 810, the operator may use a search option of the sharing platform by inputting parameters like street address, schedule from and to date, type of lessor device (VM, storage), API, lessor device attributes (e.g. GPU), network, lessor device quality (MTBF rating), security rating, lessor device credentials (star ratings), etc. At step 812, short-listed lessor devices may be filtered and received from the sharing platform. It may be understood that the sharing platform may filter and short-list the lessor devices, based on the inputted parameters, using an inbuilt algorithm. At step 814, the operator may check details of each lessor device, sample pictures provided, mock output, comments from previous users, etc.

At step 816, the operator may mark suitable lessor devices and may put these lessor devices into a cart. At step 818, a check may be performed to determine whether more lessor devices may be required. It if is determined that more lessor devices are required, the method 800 may once again proceed to step 810 ("No" path) where the operator may use the search option to search for more lessor devices, following which the steps 812-814 may be repeated. If at step 818, it is determined that more lessor devices are not required, the method 800 may proceed to step 820 ("No" path). At step 820, the operator may view the cart and estimate an actual budget. At step 822, the operator may mark a purchase confirmation. At step 824, a schedule may be locked for the lessor devices for a time window. For example, the schedule may be locked by the scheduler module.

At step 826, a check may be performed to determine if all lessor devices are locked or not. If it is determined that all lessor devices are not locked, the method 800 may once again proceed to step 816 ("No" path). Accordingly, the steps 816 to 826 may be repeated in loop until it is determined that all the lessor devices are locked. At step 826, if it is determined that all lessor devices are locked, the method 800 may proceed to step 838 ("Yes" path). At step 828, a commit may be invoked in the scheduler's asset calendar, i.e. a time and date may be committed in the calendar. Further, at step 828, scripts and images may be loaded into a blockchain store. At step 830, a financial transaction may be fulfilled, via a smart contract. At step 832, a pending-for-provision database may be updated for system to execute at appropriate time. At step 834, the platform may wait in the queue wait till a next wakeup.

At step 836, a check may be performed to determine if it is time for provision or not. If it is determined that it is not time for provision, the method 800 may once again proceed to step 834 ("No" path), and the platform may wait in the queue wait until it is time for provision. However, if at step 836, it is determined that it is time for provision, the method 800 may proceed to step 838 ("Yes" path). At step 838, a handshake may be performed with the lessor device. At step 840, service pre-configure steps may be executed. At step 842, service configuration steps may be executed. At step 844, test scripts and steps may be executed.

At step 846, a check may be performed to determine if the process (of executing test scripts and steps) is a success or not. If it is determined that the process is not a success, the method 800 may proceed to step 848 ("No" path), where further it may be determined whether the platform has timed out or not. If it is determined that the platform has timed out, the method 800 may proceed to step 850 ("Yes" path). At step 850, the provisioning may be retried, and thereafter, the method 800 may once again proceed to step 838, and the steps 838 to 846 may be repeated. However, if at step 848, it is determined that the platform has not timed out, the method 800 may proceed to step 852 ("No" path). At step 852, a new queue may be picked up, and thereafter, the method may once again proceed to step 838, and the steps 838 to 846 may be repeated.

Returning back to step 846, if it is determined that the process is a success, the method 800 may proceed to step 854 ("yes path"), where further it may be determined whether there are pending devices in the queue. If it is determined that there are pending devices in the queue, the method 800 may proceed to step 854, where further it may be determined whether a new queue may be picked up. If it is determined that there are pending devices in the queue, the method 800 may once again proceed to step 852, where a new queue may be picked up, and thereafter, the method may once again proceed to step 838, and the steps 838 to 846 may be repeated. However, at step 854, if it is determined that there are no pending devices in the queue, the method 800 may proceed to step 856, where provision status may be collated. At step 858, monitoring service may be started. At step 860, a health report health may be displayed on a user dashboard. At step 862, a check may be performed to determine if it is time for decommissioning, based on the health report. If it is determined that it is not the time for decommissioning, the method 800 may once again proceed to step 860 ("No" path), and the loop may be repeated. However, if it is determined that it is time for decommissioning, the method 800 may proceed to step 864.

At step 864, the service may be decommissioned, and a stage-2 of the smart contract may be run. At step 866, a service quality rating for lessor and the lessor device may be received. At step 868, the lessor device may be set to free for scheduling. At step 870, a report may be sent to the lessor and the lessee.

Use Case Example 2

As it will be appreciated, a personal computer (PC) may be a significant investment for an individual, and the hardware and the software may make up a sizable part of the costs, based on the capability the PC is meant to deliver. A PC meant for high end gamming, graphic design, or desktop publishing may cost multifold the cost of a PC meant for routine functions. Further, a PC meant for a personal use (stationed in a house) may be sparsely used in a day, for various reasons, such as the owner is away at work, or is travelling, etc. Further, these PCs may not be mobile and can't be shifted and leased out.

The technique disclosed above may enable over-the-wire sharing of the idle PCs by leveraging the 5G mobile communication capability. Further, by enabling high speed, low latency, over-the-wire switching of display-mouse-keyboard, the above techniques may further provide a user an experience of virtually using a local PC.

Figure 9A:
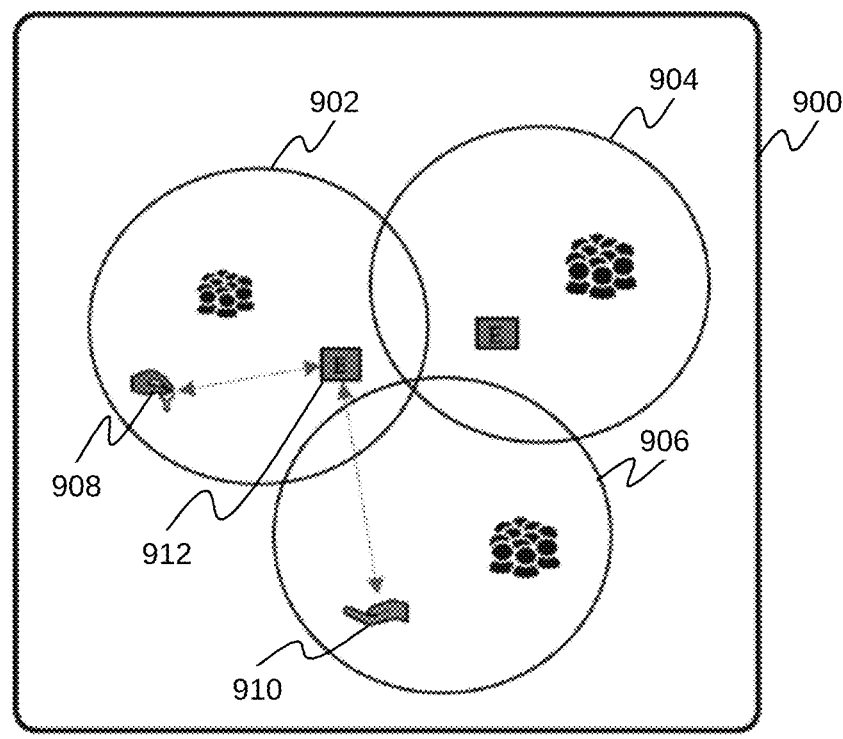
FIG. 9A illustrates an exemplary scenario of sharing a PC by a lessor with a lessee, in accordance with an embodiment.

Referring now to FIG. 9A, an exemplary scenario 900 of sharing a PC by a lessor 908 with a lessee 910 is illustrated. As shown, the lessor 908 may be located in a first spatial zone 902 and the lessee 910 may be located in a third spatial zone 906. Further, a Telco edge may be located in each of the first spatial zone 902 and a second spatial zone 904. The lessor 908 may share their PC with the lessee 910 through a Telco edge 912.

Figure 9B:
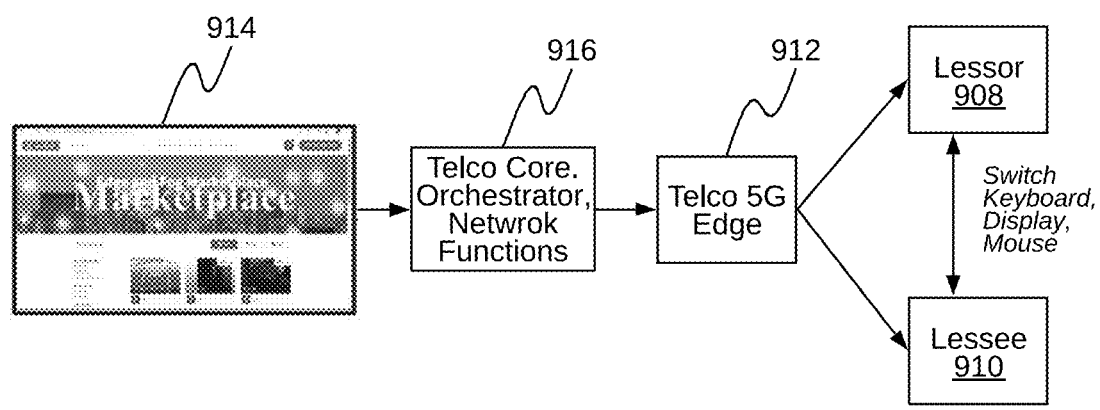
FIG. 9B illustrates an exemplary process of sharing a PC by a lessor with the lessee, in accordance with an exemplary embodiment.

Referring now to FIG. 9B, an exemplary process 900 of sharing the PC by a lessor 908 with the lessee 910 is illustrated. As mentioned earlier, a marketplace platform 914 may allow the lessor 908 (having 5G capability) to share with a lessee 910 their PC. A connection between the lessor 908 with the lessee 910 may be established (for sharing) via a telco core, orchestrator, and network functions device 916 and a Telco edge 912. Once the connection is established, a switching of display-mouse-keyboard may be enabled between the lessor 908 and the lessee 910.

Figure 10:
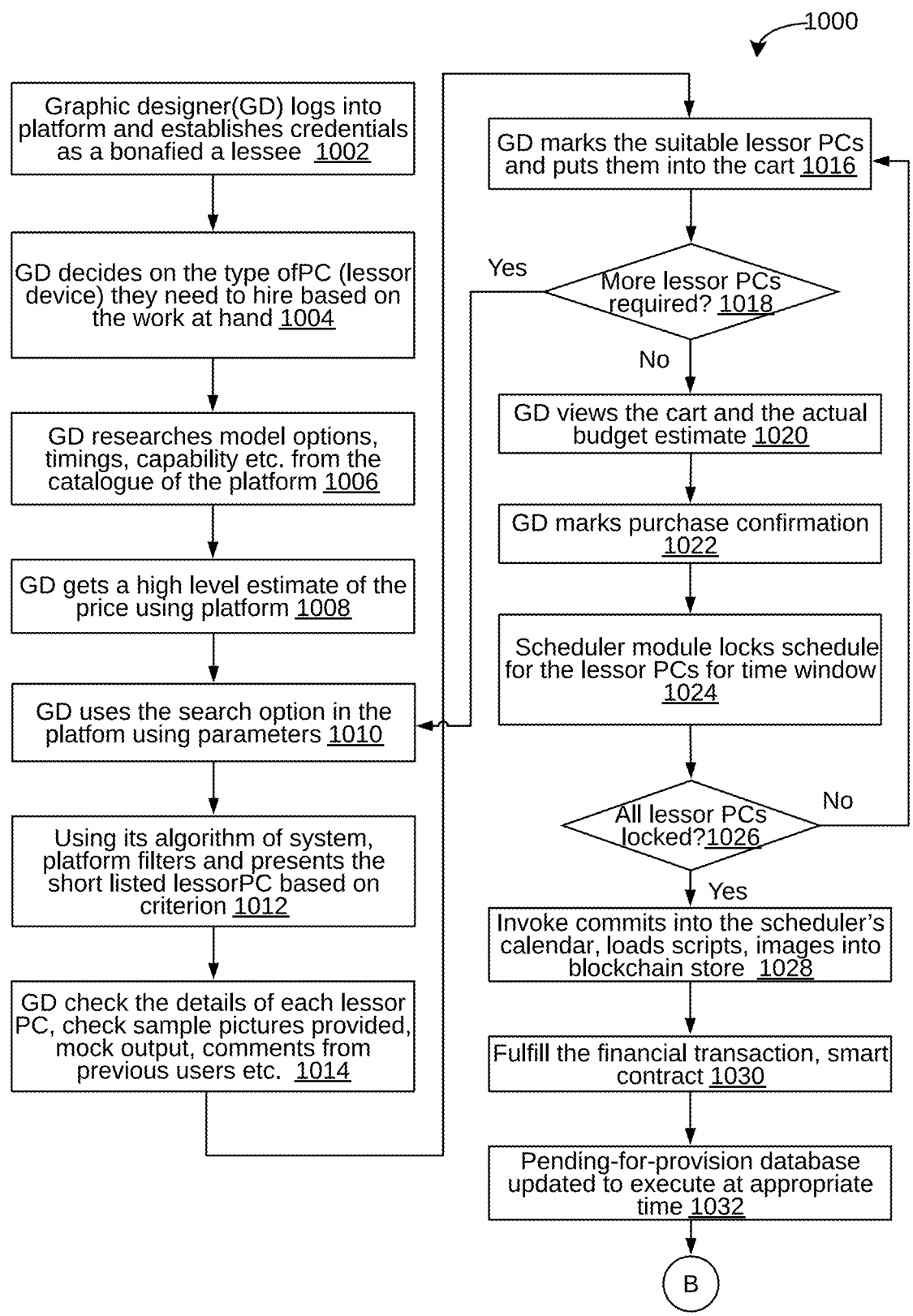
FIG. 10 is a flowchart of an example method of sharing a PC between lessor and a lessee, in accordance with an exemplary embodiment.

Referring now to FIG. 10, a flowchart of an example method 1000 of sharing a PC between lessor and a lessee is illustrated. At step 1002, a lessee (seeking to borrow computing capacity of a lessor's PC) may log into the sharing platform. For example, the lessee may be a graphic designer (GD) who might be needing additional computing capacity for designing graphic intensive visuals. Further, the GD may login via a web interface to get a personalized profile. At step 1004, the GD may analyze its computing requirement. Accordingly, the GD may decide on the type of PC they need to hire based on the work at hand. At step 1006, the GD may model the computing capacity using assets of the sharing platform, and may create a catalogue of available edge devices that are compatible.

At step 1008, the GD may obtain a high-level estimate of the associated cost. The GD may obtain this cost using assets of the sharing platform. At step 1010, the GD may use a search option of the sharing platform by inputting parameters like street address, schedule from and to date, type of asset (VM, storage), API, asset attributes (e.g. GPU), network, asset quality (MTBF rating), security rating, asset credentials (star ratings), etc. At step 1012, short-listed PCs (i.e. lessor devices) may be filtered and received from the sharing platform. It may be understood that the sharing platform may filter and short-list the PCs, based on the inputted parameters, using an inbuilt algorithm. At step 1014, the GD may check details of each PC, sample pictures provided, mock output, comments from previous users, etc.

At step 1016, the GD may mark suitable Pcs and may put these PCs into a cart. At step 1018, a check may be performed to determine whether more PCs may be required. It if is determined that more PCs are required, the method 1000 may once again proceed to step 1010 ("No" path) where the GD may use the search option to search for more PCs, following which the steps 1012-1014 may be repeated. If at step 1018, it is determined that more PCs are not required, the method 1000 may proceed to step 1020 ("No" path). At step 1020, the GD may view the cart and estimate an actual budget. At step 1022, the GD may mark a purchase confirmation. At step 1024, a schedule may be locked for the PCs for a time window. For example, the schedule may be locked by the scheduler module.

At step 1026, a check may be performed to determine if all PCs are locked or not. If it is determined that all PCs are not locked, the method 1000 may once again proceed to step 1016 ("No" path). Accordingly, the steps 1016 to 1026 may be repeated in loop until it is determined that all the PCs are locked. At step 1026, if it is determined that all PCs are locked, the method 1000 may proceed to step 1038 ("Yes" path). At step 1028, a commit may be invoked in the scheduler's calendar, i.e. a time and date may be committed in the calendar. Further, at step 1028, scripts and images may be loaded into a blockchain store. At step 1030, a financial transaction may be fulfilled, via a smart contract. At step 1032, a pending-for-provision database may be updated for system to execute at appropriate time. At step 1034, the sharing platform may wait in the queue wait till a next wakeup.

At step 1036, a check may be performed to determine if it is time for provision or not. If it is determined that it is not time for provision, the method 1000 may once again proceed to step 1034 ("No" path), and the platform may wait in the queue wait until it is time for provision. However, if at step 1036, it is determined that it is time for provision, the method 1000 may proceed to step 1038 ("Yes" path). At step 1038, a handshake may be performed with lessor's PC. At step 1040, in-PC pre-configure steps may be executed. At step 1042, in-PC configuration steps may be executed. At step 1044, in-PC test scripts and steps may be executed.

At step 1046, a check may be performed to determine if the process (of executing in-PC test scripts and steps) is a success or not. If it is determined that the process is not a success, the method 1000 may proceed to step 1048 ("No" path), where further it may be determined whether the platform has timed out or not. If it is determined that the platform has timed out, the method 1000 may proceed to step 1050 ("Yes" path). At step 1050, the provisioning may be retried, and thereafter, the method 1000 may once again proceed to step 1038, and the steps 1038 to 1046 may be repeated. However, if at step 1048, it is determined that the platform has not timed out, the method 1000 may proceed to step 1052 ("No" path). At step 1052, a new queue may be picked up, and thereafter, the method may once again proceed to step 1038, and the steps 1038 to 1046 may be repeated.

Returning back to step 1046, if it is determined that the process is a success, the method 1000 may proceed to step 1054 ("yes path"), where further it may be determined whether there are pending devices in the queue. If it is determined that there are pending devices in the queue, the method 1000 may proceed to step 1054, where further it may be determined whether a new queue may be picked up. If it is determined that there are pending devices in the queue, the method 1000 may once again proceed to step 1052, where a new queue may be picked up, and thereafter, the method may once again proceed to step 1038, and the steps 1038 to 1046 may be repeated. However, at step 1054, if it is determined that there are no pending devices in the queue, the method 1000 may proceed to step 1056, where provision status may be collated. At step 1058, monitoring service may be started. At step 1060, a health report health may be displayed on a user dashboard. At step 1062, a check may be performed to determine if it is time for decommissioning, based on the health report. If it is determined that it is not the time for decommissioning, the method 1000 may once again proceed to step 1060 ("No" path), and the loop may be repeated. However, if it is determined that it is time for decommissioning, the method 1000 may proceed to step 1064.

At step 1064, the PC may be decommissioned, and a stage-2 of the smart contract may be run. At step 1066, a quality rating for lessor and the lessor device may be received. At step 1068, the PC may be set to free for scheduling. At step 1070, a report may be sent to the lessor and the lessee.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 11:
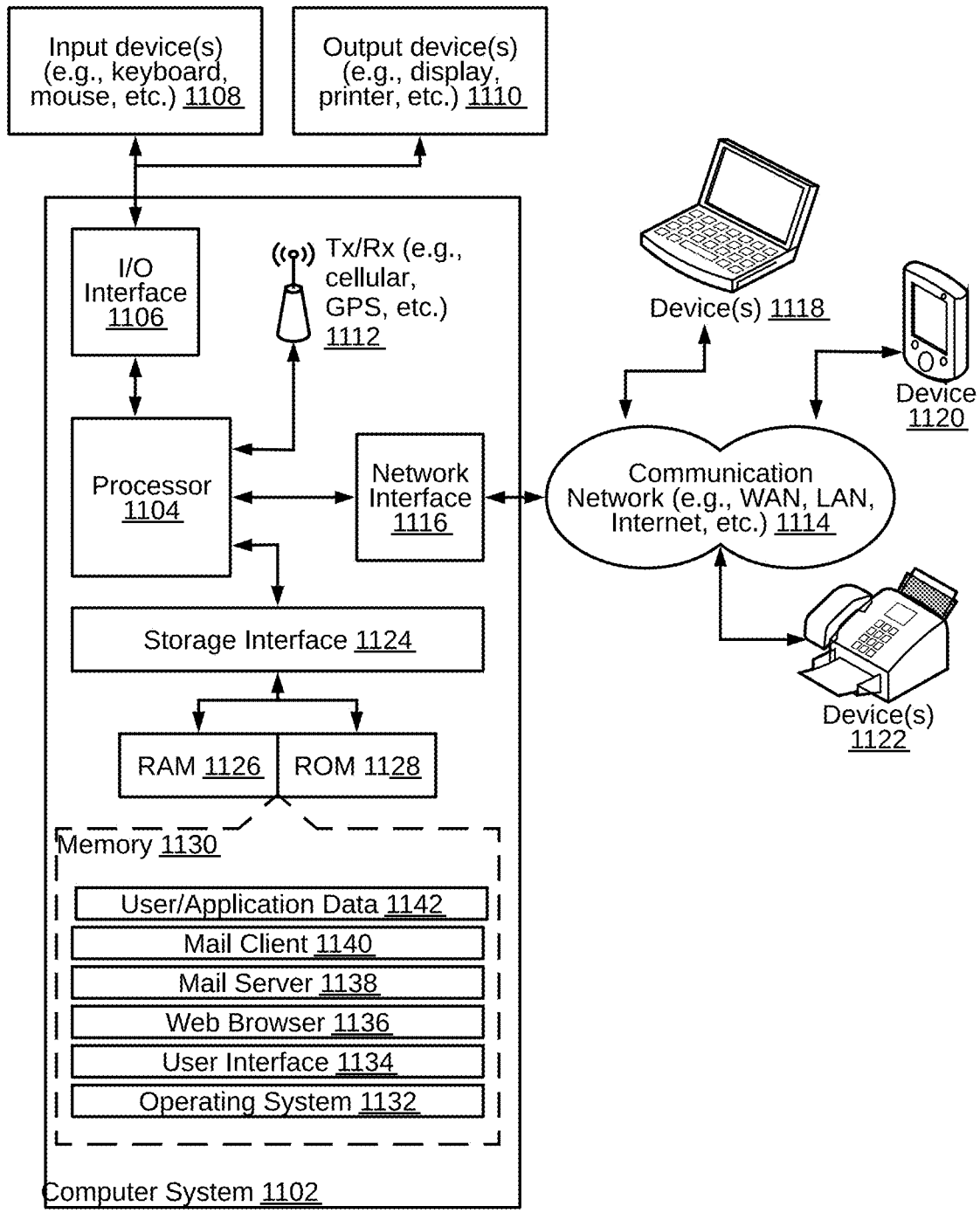
FIG. 11 is a block diagram of an exemplary computer system for implementing various embodiments.

The disclosed methods and systems may be implemented on a conventional or a general-purpose computer system, such as a personal computer (PC) or server computer. Referring now to FIG. 11, a block diagram of an exemplary computer system 1102 for implementing various embodiments is illustrated. Computer system 1102 may include a central processing unit ("CPU" or "processor") 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or data repository components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE®

IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component, Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as Internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such data repositories may be implemented as fault-tolerant, relational, scalable, secure data repositories such as ORACLE® data repository OR SYBASE® data repository. Alternatively, such data repositories may be implemented using standardized data structures, such as an array, hash, linked list, struct, structured text file (for example, XML), table, or as object-oriented data repositories (for example, using OBJECTSTORE® object data repository, POET® object data repository, ZOPE® object data repository, etc.). Such data repositories may be consolidated or distributed, sometimes among the various computer systems discussed above in this disclosure. It is to be understood that the structure and operation of the any computer or data repository component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

One or more techniques described in the various embodiments discussed above provide for generating a plurality heat maps corresponding to training dataset (for example, images) based on relevance of neurons and input pixels and taking average of the generated heat maps over multiple classes by assigning weightages proportional to degree of overlap, and categorizing different regions of the heat map based on their level of importance/relevance in decision making. The techniques further provide for encrypting data available in different regions of the image with different homomorphic encryption keys of different strengths, for example, the region which is more common among the set of classifications is assigned with higher-strength homomorphic encryption key. The techniques further provide for generating a scale factor for interpreting the heat map, which indicates a ratio between the weights of the encrypted model and the non-encrypted model. Further, the techniques provide for decrypting the encrypted data using the homomorphic encryption keys.

As will be appreciated by those skilled in the art, the above techniques pertain to providing a platform for sharing edge computing resources between a lessor and a lessee. The proposed techniques provide for an object repository system, which may present dynamic status by providing search interface to a lessee to narrow down on lessor devices to hire. The techniques further provide for a network functions virtualization and orchestration (NFVO) system, where the NFVO may create a secure 5G slice connecting the lessee and the lessor, and establish a secured TLS tunnel between the lessor and the lessee through VNF. Further, a domain ontology system may provide a knowledge representation of telecommunication domain and extension, and may present semantic solutions for various usage areas leveraging semantic web, and place a secured tunnel between the lessor and the lessee. A secured tunnel component developed and deployed as NFV in the 5G communication network and placed between the lessor and the lessee, may ensure a trusted sharing between the parties. A tight looped reward system may ensure a tamper proof reward system to prevent fraudulent claims. Furthermore, a centralized resource usage monitoring and scheduling system may ensure tracking availability and usage to global users for their consumption.

The specification has described method and system for sharing edge computing resources over a sharing platform. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of sharing an edge computing resource, the method comprising:
   receiving from one or more lessor edge computing resources, by a sharing device, one or more first requests for presenting an availability of the one or more lessor edge computing resources;
   receiving from a lessee edge computing resource, by the sharing device, a second request for availing at least one lessor edge computing resource from the one or more lessor edge computing resources;
   upon receiving the second request, presenting, by the sharing device, the one or more first requests corresponding to the one or more lessor edge computing resources, to the lessee edge computing resource;
   allocating one or more workbenches to one or more lessees, one or more lessors and one or more partners on a unified marketplace portal;
   upon allocation of a workbench of the one or more workbenches to a lessee associated with the lessee edge computing resource, presenting, a search interface to the lessee edge computing resource, wherein the search interface provides for discovery of the one or more lessor edge computing resources, based on one or more parameters associated with the one or more lessor edge computing resources, wherein a dynamic status of the one or more lessor edge computing resources is presented from an object repository, and wherein the lessee edge computing resource is associated with a predefined virtual machine image that is used for interfacing with the at least one lessor edge computing resource by matching with a checksum;
   receiving from the lessee edge computing resource, by the sharing device, a selection of a first request from the one or more first requests; and
   upon receiving the selection, creating, by the sharing device, a connection between the lessee edge computing resource and the lessor edge computing resource corresponding to the received selection.

2. The method of claim 1, wherein the creating comprises authenticating the lessee associated with the lessee edge computing resource and a lessor associated with the lessor edge computing resource corresponding to the received selection.

3. The method of claim 2, wherein the authenticating is two factor-based, and wherein the authenticating comprises authenticating via a Short Messaging Service (SMS) and authenticating via an online service.

4. The method of claim 1, wherein the creating further comprises establishing a secure connection tunnel between the lessee edge computing resource and the lessor edge computing resource corresponding to the received selection.

5. The method of claim 4, further comprising:
   monitoring a time period for which the secure connection tunnel is active;
   deactivating the secure connection tunnel, upon lapsing of a predetermined time period, or a prompt from at least one of the lessee edge computing resource and the lessor edge computing resource;
   upon deactivating, generating a bill chargeable to the lessee edge computing resource, based on one of the predetermined time or the time period for which the secure connection tunnel is active; and
   initiating a financial transaction between the lessee edge computing resource and the lessor edge computing resource, based on the generated bill.

6. The method of claim 1, wherein the one or more parameters comprise a computing capacity associated with each of the one or more lessor edge computing resources, an availability of each of the one or more lessor edge computing resources, and a cost associated with each of the one or more lessor edge computing resources.

7. A sharing device for sharing an edge computing resource, the sharing device comprising:
   a processor; and
   a memory communicatively coupled to the processor, wherein the memory stores processor instructions, which, on execution, causes the processor to:
   receive from one or more lessor edge computing resources, one or more first requests for presenting an availability of the one or more lessor edge computing resources;
   receive from a lessee edge computing resource, a second request for availing at least one lessor edge computing resource from the one or more lessor edge computing resources;
   upon receiving the second request, present the one or more first requests corresponding to the one or more lessor edge computing resources, to the lessee edge computing resource;
   allocate one or more workbenches to one or more lessees, one or more lessors and one or more partners on a unified marketplace portal;
   upon allocation of a workbench of the one or more workbenches to a lessee associated with the lessee edge computing resource, present, a search interface to the lessee edge computing resource, wherein the search interface provides for discovery of the one or more lessor edge computing resources, based on one or more parameters associated with the one or more lessor edge computing resources, wherein a dynamic status of the one or more lessor edge computing resources is presented from an object repository, and wherein the lessee edge computing resource is associated with a predefined virtual machine image that is used for interfacing with the at least one lessor edge computing resource by matching with a checksum;

receive from the lessee edge computing resource, a selection of a first request from the one or more first requests; and upon receiving the selection, create a connection between the lessee edge computing resource and the lessor edge computing resource corresponding to the received selection.

8. The sharing device of claim 7, wherein the creating comprises authenticating the lessee associated with the lessee edge computing resource and a lessor associated with the lessor edge computing resource corresponding to the received selection.

9. The sharing device of claim 8, wherein the authenticating is two factor-based, and wherein the authenticating comprises authenticating via a Short Messaging Service (SMS) and authenticating via an online service.

10. The sharing device of claim 7, wherein the creating further comprises establishing a secure connection tunnel between the lessee edge computing resource and the lessor edge computing resource corresponding to the received selection.

11. The sharing device of claim 10, wherein the processor instructions further cause the processor to:

monitor a time period for which the secure connection tunnel is active;

deactivate the secure connection tunnel, upon lapsing of a predetermined time period, or a prompt from at least one of the lessee edge computing resource and the lessor edge computing resource;

upon deactivating, generate a bill chargeable to the lessee edge computing resource, based on one of the predetermined time or the time period for which the secure connection tunnel is active; and initiate a financial transaction between the lessee edge computing resource and the lessor edge computing resource, based on the generated bill.

12. The sharing device of claim 7, wherein the one or more parameters comprise a computing capacity associated with each of the one or more lessor edge computing resources, an availability of each of the one or more lessor edge computing resources, and a cost associated with each of the one or more lessor edge computing resources.

13. A non-transitory computer-readable storage medium having stored thereon, a set of computer-executable instructions causing a computer comprising one or more processors to perform steps comprising:

receiving from one or more lessor edge computing resources, one or more first requests for presenting an availability of the one or more lessor edge computing resources;

receiving from a lessee edge computing resource, a second request for availing at least one lessor edge computing resource from the one or more lessor edge computing resources;

upon receiving the second request, presenting the one or more first requests corresponding to the one or more lessor edge computing resources, to the lessee edge computing resource;

allocating one or more workbenches to one or more lessees, one or more lessors and one or more partners on a unified marketplace portal;

upon allocation of a workbench of the one or more workbenches to a lessee associated with the lessee edge computing resource, wherein the search interface provides for discovery of the one or more lessor edge computing resources, based on one or more parameters associated with the one or more lessor edge computing resources, wherein a dynamic status of the one or more lessor edge computing resources is presented from an object repository, and wherein the lessee edge computing resource is associated with a predefined virtual machine image that is used for interfacing with the at least one lessor edge computing resource by matching with a checksum;

receiving from the lessee edge computing resource, a selection of a first request from the one or more first requests; and upon receiving the selection, creating a connection between the lessee edge computing resource and the lessor edge computing resource corresponding to the received selection.

14. The non-transitory computer-readable storage medium of claim 13, wherein the creating comprises authenticating the lessee associated with the lessee edge computing resource and a lessor associated with the lessor edge computing resource corresponding to the received selection, wherein the authenticating is two factor-based, and wherein the authenticating comprises authenticating via a Short Messaging Service (SMS) and authenticating via an online service.

15. The non-transitory computer-readable storage medium of claim 13, wherein the creating further comprises establishing a secure connection tunnel between the lessee edge computing resource and the lessor edge computing resource corresponding to the received selection.

16. The non-transitory computer-readable storage medium of claim 15, wherein the set of computer-executable instructions causing the computer comprising the one or more processors to perform further steps comprising:

monitoring a time period for which the secure connection tunnel is active;

deactivating the secure connection tunnel, upon lapsing of a predetermined time period, or a prompt from at least one of the lessee edge computing resource and the lessor edge computing resource;

upon deactivating, generating a bill chargeable to the lessee edge computing resource, based on one of the predetermined time or the time period for which the secure connection tunnel is active; and initiating a financial transaction between the lessee edge computing resource and the lessor edge computing resource, based on the generated bill.

17. The method of claim 13, wherein the one or more parameters comprise a computing capacity associated with each of the one or more lessor edge computing resources, an availability of each of the one or more lessor edge computing resources, and a cost associated with each of the one or more lessor edge computing resources.

* * * * *